US011790581B2

(12) United States Patent
Chakrabarty et al.

(10) Patent No.: US 11,790,581 B2
(45) Date of Patent: Oct. 17, 2023

(54) TRANSFERRING HAIRSTYLES BETWEEN PORTRAIT IMAGES UTILIZING DEEP LATENT REPRESENTATIONS

(71) Applicant: Adobe Inc., San Jose, CA (US)

(72) Inventors: Saikat Chakrabarty, Noida (IN); Sunil Kumar, Mathura (IN)

(73) Assignee: Adobe Inc., San Jose, CA (US)

( * ) Notice: Subject to any disclaimer, the term of this patent is extended or adjusted under 35 U.S.C. 154(b) by 233 days.

(21) Appl. No.: 17/034,845

(22) Filed: Sep. 28, 2020

(65) Prior Publication Data

US 2022/0101577 A1 Mar. 31, 2022

(51) Int. Cl.
*G06T 11/60* (2006.01)
*G06K 9/00* (2022.01)
(Continued)

(52) U.S. Cl.
CPC ............... *G06T 11/60* (2013.01); *G06N 3/08* (2013.01); *G06T 5/50* (2013.01); *G06V 40/165* (2022.01); *G06V 40/171* (2022.01)

(58) Field of Classification Search
CPC ............ G06N 3/049; G06N 3/02; G06N 3/08; G06N 20/00; G06N 3/088; G06N 5/022;
(Continued)

(56) References Cited

U.S. PATENT DOCUMENTS

2017/0287123 A1 10/2017 Bedi et al.
2018/0137663 A1* 5/2018 Rodriguez .............. G06T 19/20
(Continued)

FOREIGN PATENT DOCUMENTS

WO WO-2020104990 A1 * 5/2020
WO WO-2021050923 A1 * 3/2021 ......... C12N 15/1058

OTHER PUBLICATIONS

Yin, Weidong & Fu, Yanwei & Ma, Yiqing & Jiang, Yu-Gang & Xiang, Tao & Xue, Xiangyang. (2017). Learning to Generate and Edit Hairstyles. 1627-1635. 10.1145/3123266.3123423. https://yanweifu.github.io/papers/hairstyle_v_14_weidong.pdf.
(Continued)

*Primary Examiner* — Todd Buttram
(74) *Attorney, Agent, or Firm* — Keller Preece PLLC

(57) ABSTRACT

The disclosure describes one or more embodiments of systems, methods, and non-transitory computer-readable media that generate a transferred hairstyle image that depicts a person from a source image having a hairstyle from a target image. For example, the disclosed systems utilize a face-generative neural network to project the source and target images into latent vectors. In addition, in some embodiments, the disclosed systems quantify (or identify) activation values that control hair features for the projected latent vectors of the target and source image. Furthermore, in some instances, the disclosed systems selectively combine (e.g., via splicing) the projected latent vectors of the target and source image to generate a hairstyle-transfer latent vector by using the quantified activation values. Then, in one or more embodiments, the disclosed systems generate a transferred hairstyle image that depicts the person from the source image having the hairstyle from the target image by synthesizing the hairstyle-transfer latent vector.

20 Claims, 14 Drawing Sheets

(51) Int. Cl.
*G06T 5/50* (2006.01)
*G06N 3/08* (2023.01)
*G06V 40/16* (2022.01)

(58) Field of Classification Search
CPC ...... G06V 40/171; G06V 40/165; G06T 5/50; G06T 11/60
See application file for complete search history.

(56) References Cited

U.S. PATENT DOCUMENTS

| | | | |
|---|---|---|---|
| 2019/0147224 | A1 | 5/2019 | Li et al. |
| 2020/0151559 | A1* | 5/2020 | Karras ............... G06N 3/045 |
| 2020/0175757 | A1* | 6/2020 | Li ..................... G06T 15/00 |
| 2020/0358983 | A1* | 11/2020 | Astarabadi ......... G06V 40/171 |
| 2021/0195142 | A1* | 6/2021 | Mireles .............. G06V 40/168 |
| 2022/0101577 | A1* | 3/2022 | Chakrabarty ........ G06T 11/60 |

OTHER PUBLICATIONS

Azmarie Wang; Hairstyle Transfer—Semantic Editing GAN Latent Code; May 24, 2020; https://medium.com/swlh/hairstyle-transfer-semantic-editing-gan-latent-code-b3a6ccf91e82.

T. Karras, S. Laine and T. Aila, "A Style-Based Generator Architecture for Generative Adversarial Networks," 2019 IEEE/CVF Conference on Computer Vision and Pattern Recognition (CVPR), Long Beach, CA, USA, 2019, pp. 4396-4405, doi: 10.1109/CVPR. 2019.00453. https://arxiv.org/pdf/1812.04948.pdf.

Sun, Tiancheng et al.; Single Image Portrait Relighting; May 2, 2019; ACM Trans. Graph., vol. 38, No. 4, Article 79. https://cseweb.ucsd.edu/~ravir/portrait_relighting.pdf.

R. Abdal et al. in A Style-Based StyleFlow: Attribute-conditioned Exploration of StyleGAN—Generated Images using Conditional Continuous Normalizing Flows, arXiv:2008.02401, (2020) (https://arxiv.org/abs/2008.02401).

Wei et al. in Real-Time Hair Rendering using Sequential Adversarial Networks, Conference on Computer Vision, ECCV 2018 (http://www.vovakim.com/papers/18_ECCV_HairRenderNet.pdf).

Chai et al. in High-Quality Hair Modeling from a Single Portrait Photo, ACM Transactions on Graphics, Oct. 2015, Article No. 204 (https://dl.acm.org/doi/10.1145/2816795.2818112).

Connelly Barnes et al., "PatchMatch: A Randomized Correspondence Algorithm for Structural Image Editing," ACM Transactions on Graphics (Proc. SIGGRAPH), Aug. 2009 (https://dl.acm.org/doi/10.1145/1531326.1531330).

* cited by examiner

TRANSFERRING HAIRSTYLES BETWEEN PORTRAIT IMAGES UTILIZING DEEP LATENT REPRESENTATIONS

BACKGROUND

Recent years have seen a rapid increase in the use of digital graphics tools to create or modify digital content. In particular, individuals and businesses increasingly utilize digital graphics tools to edit digital images. Indeed, with the increased availability of mobile devices having built-in cameras, many individuals and businesses produce portrait images and utilize digital graphics tools to edit those portrait images. For instance, digital graphics tools are often used to edit portrait images by transferring hairstyles from one portrait image to another. Although conventional digital content modification systems often modify portrait images by transferring hairstyles from other portrait images using generative adversarial networks, these conventional systems have a number of shortcomings with regard to accuracy and flexibility in producing portrait images with transferred hairstyles.

For example, many conventional digital content modification systems that transfer hairstyles between portrait images are rigid. For instance, conventional systems that utilize generative adverse networks are often fine-tuned to utilize only a limited set of template hairstyles. As such, these conventional systems cannot easily (or accurately) transfer arbitrary hairstyles from images (that are not within the template of hairstyles) to a portrait image.

Furthermore, in addition to not being able to utilize hairstyles outside a fixed template of hairstyles, many conventional systems also fail to easily transfer shorter hairstyles to portrait images that originally depicts a longer hairstyle. In particular, during the transfer of shorter hairstyles to a portrait image that depicts a longer hairstyle, portions of the face (depicted within the portrait image) that were originally covered by a longer hairstyle are exposed during a hairstyle transfer. Many conventional systems fail to produce modified portrait images that correctly account for the exposed portions in the portrait image. Accordingly, these conventional systems are often rigid and modify portrait images with hairstyle transfers only when the hairstyle transfer is from short hair to long hair.

Furthermore, conventional digital content modification systems often produce inaccurate results while modifying portrait images to transfer hairstyles. For instance, many conventional systems produce a flawed depiction of the transferred hairstyle within the portrait image such that the resulting image appears artificial. In addition, conventional systems oftentimes introduce variations in other parts of a portrait image while modifying the portrait image to include the transferred hairstyle. These variations often produce modified images in which the depicted person is unlike the originally depicted person. Moreover, many conventional digital content modification systems result in a reduction of quality or resolution within the modified portrait images having transferred hairstyles. Oftentimes, conventional systems often produce modified portrait images that are unusable due to such inaccuracies.

SUMMARY

This disclosure describes one or more embodiments of systems, non-transitory computer readable media, and methods that solve the foregoing problems in addition to providing other benefits. In particular, the disclosed systems modify source images (depicting persons with hairstyles) using arbitrary target images (depicting other persons with other hairstyles) by transferring the target image hairstyles to the source images. For example, the disclosed systems utilize a face-generative neural network to project the source and target images into latent vectors. In some embodiments, when the target image depicts a shorter hairstyle than the source image such that a hairstyle transfer will expose portions of the source image, the disclosed systems synthesize facial attributes within the exposed portions of the source image and project the reconstructed source image into a latent vector. In addition, the disclosed systems quantify (or identify) activation values that control hair features for the projected latent vectors of the target and source image. Using the quantified activation values, the disclosed systems selectively combine (e.g., via splicing) the projected latent vectors of the target and source image to generate a hairstyle-transfer latent vector. Then, the disclosed systems generate a transferred hairstyle image that depicts the person from the source image having the hairstyle from the target image by synthesizing the hairstyle-transfer latent vector. Accordingly, the disclosed systems provide an accurate and flexible tool for transferring an arbitrary hairstyle (regardless of size) from an arbitrary target image to a source image.

BRIEF DESCRIPTION OF THE DRAWINGS

The detailed description is described with reference to the accompanying drawings in which.

DETAILED DESCRIPTION

Figure 1:
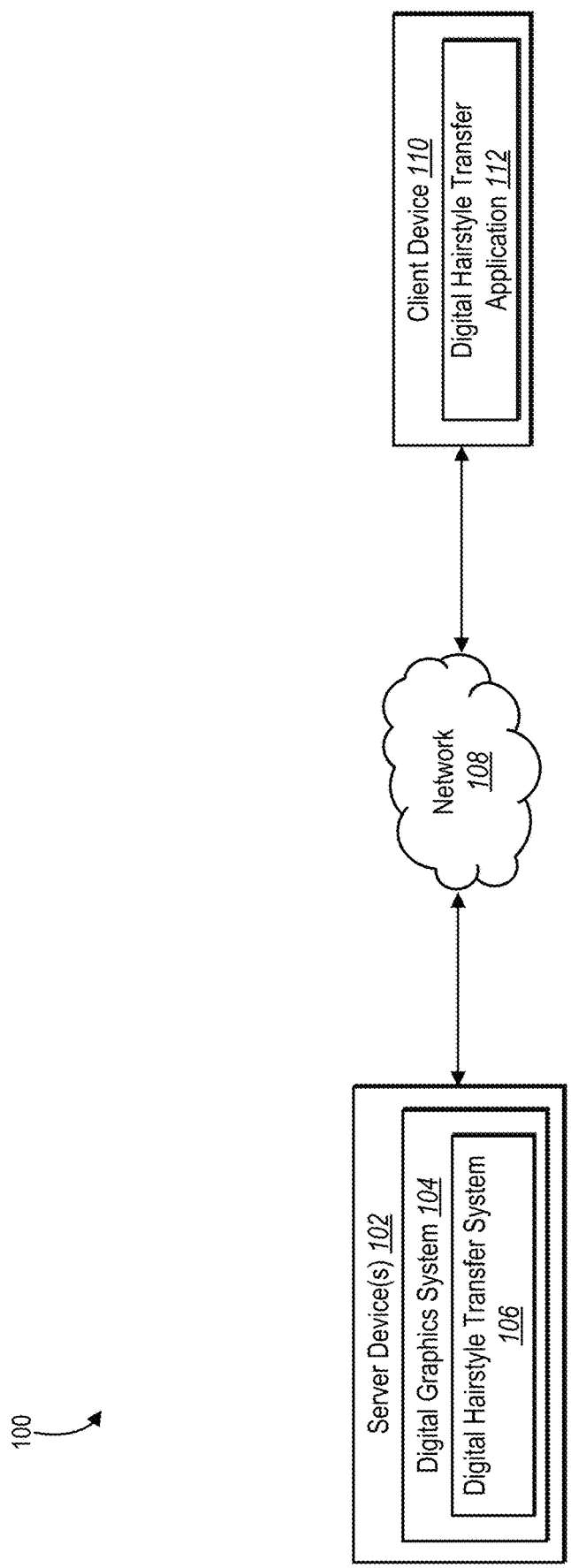
FIG. 1 illustrates a schematic diagram of an example system in which a digital hairstyle transfer system can operate in accordance with one or more embodiments.

This disclosure describes one or more embodiments of a digital hairstyle transfer system that transfers a hairstyle depicted within an arbitrary target image to a source image utilizing deep latent representations. For instance, the digital hairstyle transfer system utilizes a face-generative neural network to project a source image (depicting a person with a hairstyle) into a source latent vector and a target image (depicting another person with another hairstyle) into a target latent vector. Subsequently, in some embodiments, the digital hairstyle transfer system selectively combines (e.g., via vector splicing) the source latent vector and the target latent vector to generate a hairstyle-transfer latent vector that encodes the person depicted in the source image with the hairstyle depicted within the target image. In one or more embodiments, in order to selectively combine the source and target latent vectors, the digital hairstyle transfer system utilizes identified activation values that control hairstyle within the source and target latent vectors to determine which elements from the target latent vector to utilize in the source latent vector. Furthermore, in some instances, the digital hairstyle transfer system generates a transferred hairstyle image that depicts the person from the source image with the hairstyle from the target image by synthesizing the generated hairstyle-transfer latent vector.

As mentioned, in some embodiments, the digital hairstyle transfer system projects digital images into latent vectors. For example, the digital hairstyle transfer system utilizes a face-generative neural network to project a source image to a source latent vector and a target image to a target latent vector. In one or more embodiments, the digital hairstyle transfer system aligns facial landmarks of the persons depicted within the source and target images prior to projecting the images into latent vectors. Furthermore, in one or more additional embodiments, the digital hairstyle transfer system determines a loss between the images and corresponding synthesized images from the latent vectors corresponding to the images to adjust the latent vectors (for accuracy).

Furthermore, in one or more embodiments, when the target image depicts a shorter hairstyle than the source image such that a hairstyle transfer will expose portions of the source image, the digital hairstyle transfer system synthesizes facial attributes within the exposed portions of the source image. For example, in some instances, the digital hairstyle transfer system utilizes a facial reconstruction model to generate a reconstructed source image with synthesized facial attributes in place of the exposed portions (or regions) and projects the reconstructed source image into the source latent vector. Indeed, in one or more embodiments, the digital hairstyle transfer system identifies one or more regions of interest for the source image (e.g., the exposed region) using hair segmentation regions within the source and target image.

Moreover, in one or more embodiments, the digital hairstyle transfer system generates a hairstyle-transfer latent vector using the source and target latent vectors. For example, the digital hairstyle transfer system selectively combines the source and target latent vectors by replacing elements of the source latent vector with elements of the target latent vectors based on identified activation values that control hairstyle (or hair) features in latent vectors. To illustrate, in some embodiments, the digital hairstyle transfer system identifies activation values that control hair by introducing noise pixels within portions of an image (both the source and target images) that depict hair and projecting the image having noise pixels into a latent vector. Then, in one or more embodiments, the digital hairstyle transfer system compares the latent vector from the original image to the latent vector from the image having noise pixels to identify the activation values that control hairstyle within the latent vectors. Subsequently, in one or more embodiments, the digital hairstyle transfer system replaces elements from the source latent vector with elements from the target latent vector (e.g., using latent vector splicing) based the presence of such activation values within the target and/or source latent vectors.

Additionally, in some embodiments, the digital hairstyle transfer system generates a transferred hairstyle image that depicts a person from the source image with a hairstyle from the target image. More specifically, in one or more embodiments, the digital hairstyle transfer system synthesizes the generated hairstyle-transfer latent vector (using a face-generative neural network) to generate the transferred hairstyle image. In some embodiments, the digital hairstyle transfer system refines the hairstyle-transfer latent vector by conditionally projecting the hairstyle-transfer latent vector using a combination of losses from a face mask from the source image, a hairstyle mask from the target image, and/or a discriminator loss. Furthermore, in some instances, the digital hairstyle transfer system utilizes post-processing approaches (e.g., a blending effect) on a generated transferred hairstyle image to preserve facial attributes from the original source image within the generated transferred hairstyle image.

The disclosed digital hairstyle transfer system provides a number of advantages over conventional systems. For instance, the digital hairstyle transfer system improves the accuracy of transferring a hairstyle from an arbitrary digital image to another digital image. As an example, by utilizing hairstyle-transfer latent vectors that are generated using selective combining based on activation values of latent vectors (from a source and target image) followed by fine-tuning steps, the digital hairstyle transfer system generates transferred hairstyle images that accurately depict a person within a portrait image with a transferred hairstyle. In particular, in one or more embodiments, the digital hairstyle transfer system 106 accurately identifies features that control hairstyle from within a latent vector (of a target image) and transfers these features to a latent vector corresponding to a source image to introduce accurately introduce the hairstyle of target image into the source image.

Furthermore, in contrast to many conventional systems, the digital hairstyle transfer system also generates transferred hairstyle images that modify a portrait image with the transferred hairstyle without introducing variations in other portions of the portrait image (e.g., by utilizing conditional projecting and utilizing a blending effects in accordance with one or more embodiments). Also, by utilizing conditional projecting and utilizing blending effects in accordance with one or more embodiments, the digital hairstyle transfer system also preserves the quality and resolution of a generated transferred hairstyle image. Accordingly, in one or more embodiments, the digital hairstyle transfer system results in a transferred hairstyle image that more accurately depicts a person having a hairstyle from another image.

Moreover, unlike many conventional systems, the digital hairstyle transfer system improves the flexibility of digital image hairstyle transfer tools. More specifically, the digital hairstyle transfer system utilizes generative adverse networks to accurately transfer a hairstyle from an arbitrary image (e.g., without fine tuning specifically for the hairstyle). This is unlike many conventional systems that are limited to a set template of hairstyles. Indeed, the digital hairstyle transfer system easily and accurately modifies a portrait image to include an arbitrary (e.g., non-trained) hairstyle from an arbitrary target image selected by a user.

In addition, the digital hairstyle transfer system also enables hairstyle transfer between digital images in more use cases. For instance, the digital hairstyle transfer system easily transfers shorter hairstyles to portrait images that originally depict longer hairstyles. To illustrate, the digital hairstyle transfer system accounts for exposed portions that were originally covered by a longer hairstyle within portrait images and generates portrait images having a shorter transferred hairstyle with accurately reconstructed facial features for those exposed portions. By doing so, the digital hairstyle transfer system flexibly (and accurately) modifies portrait images to transfer a target hairstyle regardless of the length or size of the target hairstyle.

As illustrated by the foregoing discussion, the present disclosure utilizes a variety of terms to describe features and advantages of the digital hairstyle transfer system. Additional detail is now provided regarding the meaning of such terms. For instance, as used herein, the term "image" (sometimes referred to as "digital image" and/or "portrait image") refers to a digital symbol, picture, icon, and/or other visual illustration depicting one or more objects. For instance, an image includes a digital file having a visual illustration and/or depiction of a person with a hairstyle (e.g., a portrait image). Indeed, in some embodiments, an image includes, but is not limited to, a digital file with the following extensions: JPEG, TIFF, BMP, PNG, RAW, or PDF.

Furthermore, as used herein, the term "source image" refers to an image that is receiving a transferred hairstyle. Moreover, as used herein, the term "target image" refers to an image from which a hairstyle is being transferred. As used herein, the term "transferred hairstyle image" refers to an image that is synthesized (or generated) to depict a person from a source image while having a hairstyle from a target image.

As used herein, the term "hairstyle" (sometimes referred to as "hair") refers to a depicted arrangement of hair-related features of a person (or image of a person). For example, the term "hairstyle" includes a visual depiction of a positioning, shape, style, and/or color of a person's hair. In some embodiments, a hairstyle can include features such as, but are not limited to, bangs, wavy hair, curly hair, various hair colors, straight hair, long hair, short hair, receding hair, dreadlocks, and/or braided hair. In addition, in one or more additional embodiments, hairstyle includes other hair-related features of a person such as, but not limited to, beards and/or moustaches.

As used herein, the term "latent vector" (sometimes referred to as "latent representation" refers to a set of values representing characteristics and/or attributes (i.e., features) of content such as content of an image, video, and/or video frame. For instance, the term "latent vector" includes a set of values corresponding to abstracted and/or compressed attributes and/or characteristics of visual (and/or latent) features related to an image, video, and/or video frame. In one or more embodiments, a latent vector is a multi-dimensional dataset that represents attributes and/or characteristics of visual features related to an image, digital video, and/or digital video frame. In the context of an image, a latent vector includes data representing characteristics (or features) of pixels of the image in some embodiments. For example, the digital hairstyle transfer system can extract features from the image portion utilizing one or more layers of a neural network. Thus, the latent vector can comprise latent or hidden values. In these implementations, while these feature values that are generated by the digital hairstyle transfer system are not recognizable to a user, they nonetheless characterize the facial features. The latent values can be latent or can be custom features that the neural network is trained to identify, such as, facial height, width, shape, hair/no hair, and skin tone, as well as the location of a user's facial features (e.g., eyes, noise, and mouth) relative to the entire face, hair length, facial feature angles (e.g., chin angle), facial feature lengths (e.g., mouth, nose, eyes), distances between facial features (e.g., distance between eyes), facial feature curvatures/shapes, or pixel intensities. As used herein, the term "hairstyle-transfer latent vector" refers to a latent vector that represents attributes and/or characteristics of visual features of a person from a source image while having attributes and/or characteristics of visual features of a hairstyle from a target image.

Furthermore, in one or more embodiments, a latent vector includes a set of numeric metrics learned by a machine learning algorithm. For instance, in some embodiments, the digital hairstyle transfer system utilizes a face-generative neural network to encode visual (and/or latent) features of an image into a latent vector for a latent vector space. In one or more embodiments, the digital hairstyle transfer system utilizes the face-generative neural network to decode a latent vector to synthesize an image that depicts visual features represented within the latent vector.

As used herein, the term "activation value" refers to a value representing the presence of a given characteristic and/or attribute (i.e., a feature) within a latent vector of an image, video, and/or video frame. For example, the term "activation value" includes a value that indicates the amount of activation (or presence) that is associated with an element of a latent vector in regard to a given a feature (e.g., characteristic and/or attribute). For example, an activation value that controls for hairstyle indicates an amount of activation or presence of hair-related features in elements of a latent vector. In some embodiments, the digital hairstyle transfer system utilizes a set of activation values in a vector with a size similar to that of a latent vector to identify hair-related features in the latent vector by assigning higher activation values in correspondence to elements within the latent vector that are attributable to hairstyle features.

Moreover, as used herein, the term "face-generative neural network" refers to a neural network that generates photorealistic facial images (e.g., portrait images). In some embodiments, a face-generative neural network includes a generative adversarial network that generates photorealistic facial images (e.g., portrait images) from latent vectors. In some embodiments, a face-generative neural network encodes images into a latent vector space and decodes (or converts) latent vectors from the latent vector space to synthesize photorealistic facial images.

As used herein, the term "facial reconstruction model" refers to an architecture that modifies images to correct (or synthesize) facial attributes within the images. For example, facial reconstruction model can synthesize facial attributes within a region of an image that lacks facial attributes (and/or includes image defects). In some embodiments, the digital hairstyle transfer system utilizes a facial reconstruction model based on a face-generative neural network (e.g., a generative adversarial network that generates photorealistic facial images). As an example, the digital hairstyle transfer system utilizes a facial reconstruction model to reconstruct an image depicting a person that is lacking an ear (e.g., due exposing a region of the image from removal of a hairstyle) by synthesizing an image that depicts the person with an ear.

As used herein, the term "facial attribute" refers to features on a person's face depicted within an image. For example, facial attributes include features on a person's face that are depicted within an image such as, but not limited to, eyes, ears, eyebrows, lips, and/or a nose.

As used herein, the term "mask" (sometimes referred to as an "image mask") refers to a digital object (or layer) reflecting selected pixels in an image. For instance, the term "mask" includes a boundary, matrix, array, index, digital file, or other set of pixels that reflect selected one or more regions of an image. In particular, in some embodiments, a mask includes a set of pixels (e.g., within a matrix or digital file) that correspond to selected features (e.g., hair features, facial attributes, backgrounds) portrayed in an image. For example, a hairstyle mask includes a set of pixels from an image that correspond to hair features depicted within the image. Moreover, as an example, a face mask includes a set of pixels from an image that correspond to a face depicted within the image. To further illustrate, in one or more implementations, when generating a mask, the digital hairstyle transfer system can segment the pixels of the hair from the other pixels in the image. For example, the digital hairstyle transfer system can create a separate image layer that sets the pixels corresponding to the hair to positive (e.g., binary 1) while setting the remaining pixels in the second image to a neutral or negative (e.g., binary 0). When this mask layer is combined with the second image, only the pixels of the detected hair are visible.

As used herein, the term "loss" refers to a value representing a penalty (or amount of error) determined from synthesized (or generated) digital content (e.g., an image). Specifically, in some embodiments, a loss includes a value that indicates the accuracy of a synthesized (or generated) image. For example, the digital hairstyle transfer system determines a loss between a synthesized image (e.g., from a face-generative neural network) and an image (e.g., a ground truth image) to determine the accuracy of the synthesized image. For example, a loss includes, but is not limited to, a mean square loss (MSE), a perceptual loss, a quadratic loss, L2 loss, and/or learned perceptual image patch similarities (LPIPS), etc.

Turning now to the figures, FIG. 1 illustrates a schematic diagram of one embodiment of a system 100 (or environment) in which a digital hairstyle transfer system 106 can operate in accordance with one or more embodiments. As illustrated in FIG. 1, the system 100 includes server device(s) 102, a network 108, and a client device 110. As further illustrated in FIG. 1, the server device(s) 102 and the client devices 110 communicate via the network 108.

As shown in FIG. 1, the server device(s) 102 include a digital graphics system 104 which further includes the digital hairstyle transfer system 106. Indeed, in some embodiments, the digital hairstyle transfer system 106 generates a transferred hairstyle image by transferring a hairstyle depicted within a source image onto a person depicted within a source image in accordance with one or more embodiments. Furthermore, in one or more embodiments, the digital hairstyle transfer system 106 displays the transferred hairstyle image on a graphical user interface of the client device 110 (e.g., via a digital image hairstyle transfer application 112).

Additionally, as mentioned above and as illustrated in FIG. 1, the system 100 includes the client device 110. In some embodiments, the client device includes, but is not limited to, a mobile device (e.g., smartphone, tablet), a laptop, a desktop, or any other type of computing device, including those explained below with reference to FIG. 14. In one or more embodiments, although not shown in FIG. 1, the client device 110 is operated by a user to perform a variety of functions (e.g., via a digital image hairstyle transfer application 112). For example, the client device 110 performs functions such as, but not limited to, creating, storing, uploading, modifying, and/or displaying images (or other digital media content items such as digital videos). Furthermore, as shown in FIG. 1, the client device 110 communicates with the server device(s) 102 via the network 108. In some embodiments, the client device 110 provides one or more images (e.g., a source image and a target image) to the server device(s) 102.

In some embodiments, the client device 110 displays a graphical user interface having selectable options to transfer a hairstyle from a target image to a source image. For example, the client device 110 identifies a user selection of a source image and a target image. Furthermore, in some embodiments, the client device 110 detects a user interaction with a selectable option to transfer the hairstyle from the target image to the source image (e.g., to generate a transferred hairstyle image). For example, the client device 110 displays the transferred hairstyle image.

Although FIG. 1 illustrates the digital hairstyle transfer system 106 being implemented by a particular component and/or device within the system 100 (e.g., the server device(s) 102), in some embodiments the digital hairstyle transfer system 106 is implemented, in whole or in part, by other computing devices and/or components in the system 100. For example, in some embodiments, the digital hairstyle transfer system 106 is implemented on the client device 110. In particular, in some embodiments, the client device 110 generates a transferred hairstyle image by transferring a hairstyle depicted within a target image onto a person depicted within a source image in accordance with one or more embodiments. For example, in certain embodiments, the client device 110 as a mobile device (e.g., smartphone or tablet) generates a transferred hairstyle image utilizing an implementation of the digital hairstyle transfer system 106 (e.g., in accordance with one or more embodiments) directly on the client device 110.

To access the functionalities of the digital hairstyle transfer system 106 (as described above), in certain embodiments, a user interacts with the digital image hairstyle transfer application 112 on the client device 110. For instance, the digital image hairstyle transfer application 112 includes one or more software applications (e.g., to generate a transferred hairstyle image in accordance with one or more embodiments herein) installed on the client device 110. In some embodiments, the digital image hairstyle transfer application 112 is hosted on the server device(s) 102. In addition, when hosted on the server device(s) 102, the digital image hairstyle transfer application 112 is accessed by the client device 110 through web browser and/or another online interfacing platform and/or tool.

Additionally, as shown in FIG. 1, the system 100 includes the network 108. As mentioned above, in one or more embodiments, the network 108 enables communication between components of the system 100. In certain embodiments, the network 108 includes a suitable network and may communicate using any communication platforms and technologies suitable for transporting data and/or communication signals, examples of which are described with reference to FIG. 14. Furthermore, although FIG. 1 illustrates the server device(s) 102 and the client devices 110 communicating via the network 108, in certain embodiments, the various components of the system 100 communicate and/or interact via other methods (e.g., the server device(s) 102 and the client device 110 communicating directly).

As mentioned above, the digital hairstyle transfer system 106 generates a transferred hairstyle image. Indeed, in some instances, the digital hairstyle transfer system 106 generates a transferred hairstyle image depicting a person from a source image with a hairstyle from a target image. For example, FIG. 2 illustrates an overview of the digital hairstyle transfer system 106 generating a transferred hairstyle image.

Figure 2:
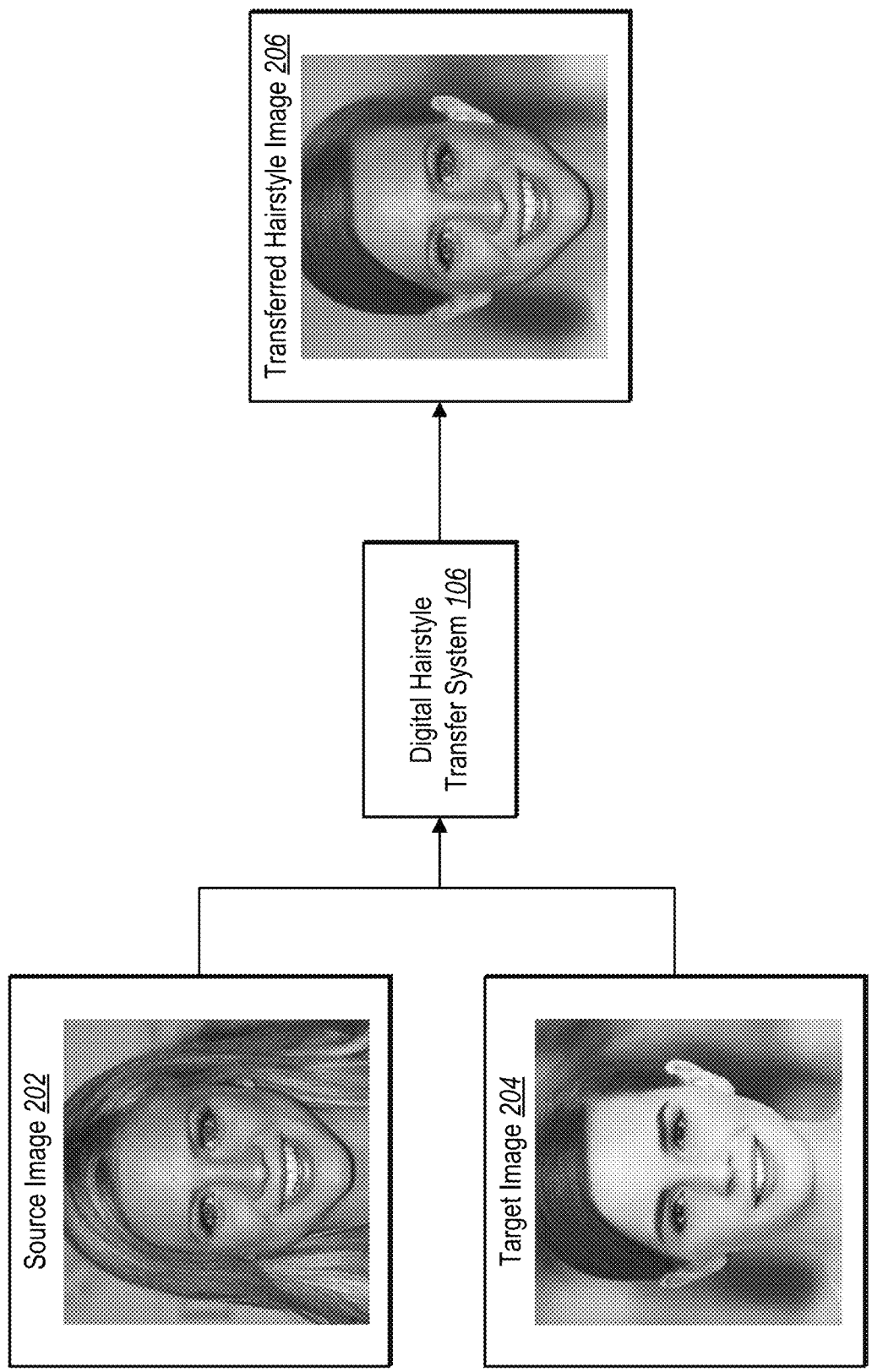
FIG. 2 illustrates an overview of a digital hairstyle transfer system generating a transferred hairstyle image in accordance with one or more embodiments.

In particular, as shown in FIG. 2, the digital hairstyle transfer system 106 identifies (or receives) a source image 202 depicting a first person with a first hairstyle and also identifies (or receives) a target image 204 depicting a second person with a second hairstyle. Subsequently (as shown in FIG. 2), the digital hairstyle transfer system 106 generates a transferred hairstyle image 206 from the source image 202 and the target image 204 (in accordance with one or more embodiments herein). Indeed, as illustrated in FIG. 2, the digital hairstyle transfer system 106 generates a generated transferred hairstyle image 206 that depicts the first person from the source image 202 with the second hairstyle from the target image 204.

As shown, the digital hairstyle transfer system 106 allows a user to select any target image with a hairstyle. The digital hairstyle transfer system 106 then transfers the hairstyle of the target image 204 to the person of the source image 202. Furthermore, the digital hairstyle transfer system 106 generates a realistic transferred hairstyle image 206 devoid of artifacts and other inaccuracies common to conventional systems.

As explained in greater detail below, the digital hairstyle transfer system 106 uses projected gradient descent to generate latent vectors for the source image 202 and the target image 204 as described in greater detail with reference to FIG. 6. Optionally, the hairstyle-transfer latent vector utilizes a facial reconstruction model to construct portions of the source face that are no longer covered by hair when the hair of the source image is replaced by the hair from the target image prior to generating the latent vectors, as described in greater detail in relation to FIG. 5. The digital hairstyle transfer system 106 then determines which latent tensor elements from the latent vectors contribute to the hairstyles of the source image 202 and the target image 202 as described in greater detail with reference to FIG. 7. The digital hairstyle transfer system 106 then utilizes latent vector splicing to generate a hairstyle-transfer latent vector based on the activation values that control the hairstyles from the source and target images as described in greater detail with reference to FIG. 8. The digital hairstyle transfer system 106 utilizes a face-generative neural network to generate the transferred hairstyle image 206 from the hairstyle-transfer latent vector, as described in greater detail in relation to FIG. 9. In some embodiments, the digital hairstyle transfer system utilizes conditional projection to refine the resultant source latent vectors as described in greater detail in relation to FIG. 9. Still further, in one or more embodiments, the digital hairstyle transfer system 106 uses post-processing techniques to help ensure a visually consistent output, as described in greater detail in relation to FIG. 10.

Figure 3:
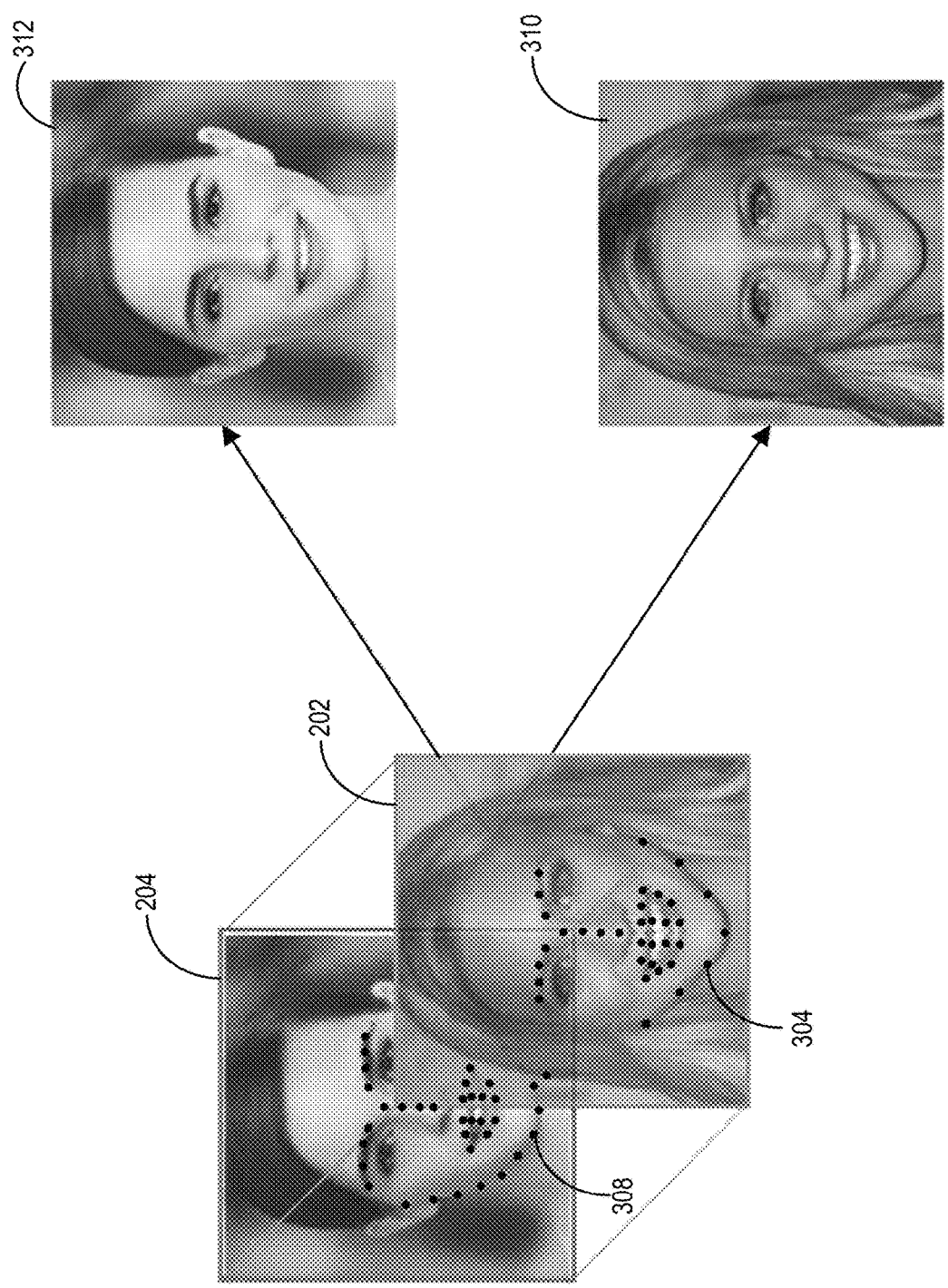
FIG. 3 illustrates a digital hairstyle transfer system aligning facial landmarks depicted within a source image and a target image in accordance with one or more embodiments.

As mentioned above, in some instances, the digital hairstyle transfer system 106 aligns facial landmarks of persons depicted in a target and source image prior to projecting the images into latent vectors. For example, FIG. 3 illustrates the digital hairstyle transfer system 106 aligning facial landmarks depicted within a target image and source image. As shown in FIG. 3, the digital hairstyle transfer system 106 identifies facial landmarks 304 within a source image 202 and facial landmarks 308 within a target image 204. Then, in some embodiments, the digital hairstyle transfer system 106 aligns the facial landmarks 304 and the facial landmarks 308 by modifying (e.g., using scaling, adjusting orientation) the source image 202 and the target image 204. Indeed, as shown in FIG. 3, the digital hairstyle transfer system 106 generates an aligned source image 310 and an aligned target image 312 upon modifying the source image 202 and the target image 204 such that the facial landmarks 304 and the facial landmarks 308 are aligned.

In one or more embodiments, the digital hairstyle transfer system 106 adjusts an orientation of the target and/or source images to align the corresponding facial landmarks. For instance, the digital hairstyle transfer system 106 adjusts the pose and/or tilt of the target (and/or source) image and/or the head orientation of the person depicted within the target (and/or source) image to align the corresponding facial landmarks. In some embodiments, the digital hairstyle transfer system 106 adjusts the rotation of the target and/or source image to align the corresponding facial landmarks.

Furthermore, in one or more additional embodiments, the digital hairstyle transfer system 106 adjusts a scale of the target and/or source image to align the corresponding facial landmarks. For instance, the digital hairstyle transfer system 106 adjusts the image size (e.g., by increasing and/or decreasing the image size) of the target and/or source image such that the facial landmarks of the target and source image are aligned (e.g., positioned similarly). As an example, the digital hairstyle transfer system 106 scales the source and target images to have similar resolutions.

In one or more embodiments, the digital hairstyle transfer system 106 modifies the target image (e.g., using orientation and/or scaling adjustments) to align facial landmarks corresponding to the target image with facial landmarks corresponding to the source image. Indeed, by modifying the target image to align with the source image based on the corresponding facial landmarks, the digital hairstyle transfer system 106 generates a target image that is similar in terms of size, orientation, and positioning of facial landmarks to that of the person depicted in the source image. In some embodiments, the digital hairstyle transfer system 106 modifies both the target and source image such that the images are similar in terms of size, orientation, and positioning of facial landmarks.

Furthermore, in some embodiments, the digital hairstyle transfer system 106 identifies facial landmarks within an image by identifying facial attributes (e.g., via key points of facial attributes) depicted with the image. In certain instances, the digital hairstyle transfer system 106 utilizes a facial landmark detection model to detect (or identify) facial landmarks within an image. For instance, the digital hairstyle transfer system 106 utilizes facial landmark detection models based on approaches such as, but not limited to, holistic approaches, constrained local model (CLM) approaches regression-based approaches, deep learning methods (e.g., style aggregated networks). For example, in one or more implementations, the digital hairstyle transfer system 106 utilizes a neural network based facial landmark detection model. In one or more embodiments, the digital hairstyle transfer system 106 utilizes a neural network based facial landmark detection model like that described in U.S. Patent Application Publication No. 2019/0147224, entitled Neural Network Based Face Detection and Landmark Localization assigned to Adobe Inc., and hereby incorporated by reference in its entirety.

In certain embodiments, the digital hairstyle transfer system 106 identifies a variety of other visual attributes in the target image and source image to align the images. In particular, in one or more embodiments, the digital hairstyle transfer system 106 modifies the target image and/or source image to match and/or align a variety of visual attributes. For instance, the digital hairstyle transfer system 106 identifies differences between visual attributes within the source image and the target image. Then, the digital hairstyle transfer system 106 modifies the visual attributes of the target image to match the visual attributes of the source image. For example, the digital hairstyle transfer system 106 identifies and modifies visual attributes such as, but not limited to, illumination and/or lighting conditions (e.g., illumination under an environmental light of where the image was captured), image saturation, image brightness, image contrast, image black points, image white balance, and/or image tone.

As an example, in some instances, the digital hairstyle transfer system 106 identifies differences between lighting conditions (e.g., different lighting environments) of the target and source image and modifies the target image (and/or the source image) to relight the target (and/or source) image to reduce the differences in lighting condition between the target and source image. In one or more embodiments, the digital hairstyle transfer system 106 utilizes a neural network-based image relighting approach to modify the target (and/or source) image to match the lighting condition between the images.

As part of aligning the images, in one or more embodiments, the digital hairstyle transfer system 106 adjusts the size of the source image and the target image to a predetermined size. In one or more embodiments, the predetermined size corresponds to an input size for a facial reconstruction model used to generate latent vectors. In particular, in one or more embodiments, the digital hairstyle transfer system 106 downscales images greater than 1024×1024 to a size of 1024×1024.

As mentioned above, in one or more embodiments, the digital hairstyle transfer system 106 identifies one or more regions of interest based on hair segmentation regions within a source and/or target image as part of transferring the hair from the target image 204 to the source image 202. In some instances, the digital hairstyle transfer system 106 segments hair-based (or hairstyle) features within an image. In particular, in some embodiments, the digital hairstyle transfer system 106 identifies regions of an image that depict hair (or hairstyle) from the segmented hair-based (or hairstyle) features. Moreover, in some embodiments, the digital hairstyle transfer system 106 generates a hairstyle (or hair) mask from the identified regions that depict hair from the image. Furthermore, in some embodiments, the digital hairstyle transfer system 106 utilizes the hairstyle mask from a source image and a target image to identify a variety of regions of interests within the source image.

Figure 4:
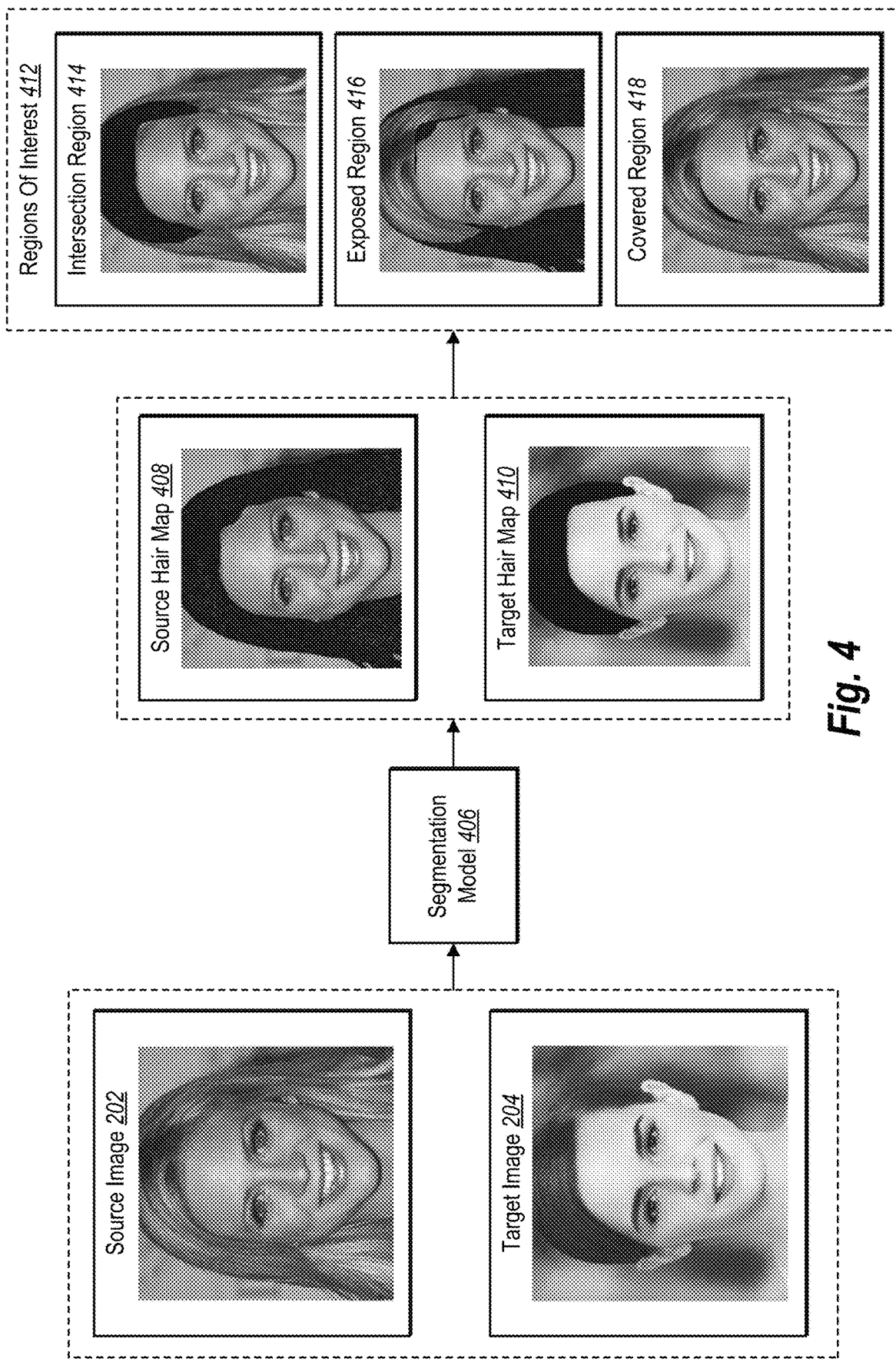
FIG. 4 illustrates a digital hairstyle transfer system generating hairstyle masks from a source image and a target image in accordance with one or more embodiments.

To illustrate, FIG. 4 shows the digital hairstyle transfer system 106 generating hairstyle masks (e.g., regions depicting hair) from a target image and source image. In addition, FIG. 4 illustrates the digital hairstyle transfer system 106 identifying a variety of regions of interest from the source image for use as part of the hairstyle transfer process. As shown in FIG. 4, the digital hairstyle transfer system 106 utilizes a segmentation model 406 on a source image 202 to identify a source hair map 408 that identifies depictions of hair within the source image 202. Furthermore, as illustrated in FIG. 4, the digital hairstyle transfer system 106 utilizes the segmentation model 406 on a target image 204 to identify a target hair map 410 that identifies depictions of hair within the target image 204.

In one or more embodiments, the digital hairstyle transfer system 106 utilizes a segmentation model to segment (or identify) hair to generate a hairstyle mask (or identify a region of hair) from an image. For example, the digital hairstyle transfer system 106 utilizes various segmentation models (or tools) for hair segmentation. As an example, the digital hairstyle transfer system 106 utilizes neural network-based hair segmentation models (e.g., U-Net, DenseNet, or convolutional neural network) to segment hair in an image. Furthermore, in some embodiments, the digital hairstyle transfer system 106 utilizes hair segmentation models and/or tools that are based on a variety of approaches such as, but not limited to, image classification, clustering, histogram-based methods, and/or edge detection.

In one or more embodiments the digital hairstyle transfer system 106 utilizes a hair segmentation neural network to generate the source hair map 408 and the target hair map 410. For example, the digital hairstyle transfer system 106 can utilize a neural network trained to segment hair, such as that described by Wei et al. in Real-Time Hair Rendering using Sequential Adversarial Networks, Conference on Computer Vision, ECCV 2018, the contents of which are hereby incorporated by reference in their entirety or as described by Chai et al. in High-Quality Hair Modeling from a Single Portrait Photo, ACM Transactions on Graphics, October 2015, Article No.: 204, the contents of which are hereby incorporated by reference in their entirety. One will appreciate that the foregoing hair segmentation neural networks are provided as examples and other embodiments may utilize other hair segmentation neural networks.

In some embodiments, the digital hairstyle transfer system 106 utilizes a segmentation model that also identifies other hair-based features such as beards and/or moustaches depicted within an image. For example, the digital hairstyle transfer system 106 utilizes a segmentation model to identify beards and/or moustaches in addition to hair to generate hairstyle masks in accordance with one or more embodiments. Then, in some instances, the digital hairstyle transfer system 106 utilizes the hairstyle masks and/or regions of interest that include identified beards and/or moustaches to transfer a hairstyle with beards and/or moustaches from a target image to a source image in accordance with one or more embodiments.

As shown in FIG. 4, the digital hairstyle transfer system 106 utilizes the source hair map 408 and the target hair map 408 to identify regions of interest 412 to aid in transferring the hair from the target image 204 to the target image 202. In particular, the digital hairstyle transfer system 106 utilizes the regions of interest 412 to designate different regions of the source image 202 or target image 204 that will be utilized during a hairstyle transfer process. In particular, the digital hairstyle transfer system 106 utilizes the regions of interest 412 for various downstream functions (as described below) during the transfer of the hairstyle depicted within the target image 204 to the person depicted within the source image 202.

For example, as shown in FIG. 4, the digital hairstyle transfer system 106 identifies an intersection region 414. In particular, as illustrated in FIG. 4, the digital hairstyle transfer system 106 identifies the intersection region 414 as an intersection between the source hair map 408 and the target hair map 408. For example, in reference to FIG. 4, the digital hairstyle transfer system 106 identifies the intersection region 414 as a region in which hair from the source hair map 408 and the target hair map 410 overlap when the images are aligned over each other.

Furthermore, as illustrated in FIG. 4, the digital hairstyle transfer system 106 identifies an exposed region 416. For instance, as shown in FIG. 4, the digital hairstyle transfer system 106 identifies the exposed region 416 as the difference between the source hair map 408 and the target hair map 410. Indeed, in one or more embodiments, the digital hairstyle transfer system 106 identifies the exposed region 416 as a non-overlapping region between the source hair map 408 and the target hair map 410. For example, as illustrated in FIG. 4, the digital hairstyle transfer system 106 identifies the exposed region 416 as a region of the source image that depicts hair but will not covered by hair once the hair of the target image 204 is transferred to the source image 202.

As shown in FIG. 4 the digital hairstyle transfer system 106 identifies a covered region 418. As an example, as illustrated in FIG. 4, the digital hairstyle transfer system 106 identifies the covered region 418 as the difference between the target hair mask 410 and the source hair map 408. The digital hairstyle transfer system 106 identifies the covered region 418 as a non-overlapping region between the target hair map 410 and the source hair map 408. In particular, the digital hairstyle transfer system 106 identifies the covered region 418 as a region of the source image that is exposed in the source image 202 (i.e., uncovered by hair) but will be covered by hair once the hair from the target image 204 is transferred to the source image 202. In one or more embodiments, the digital hairstyle transfer system 106 identifies a combination of the exposed region 416 and the covered region 418 as a non-overlapping region between the source hair map 408 and the target hair map 410.

The exposed region 416 presents difficulties because this region will no longer be covered by hair once the target hairstyle is transferred to the source image 202. To help reduce or eliminate artifacts and other indications of image manipulation in the final transferred hairstyle image that are common to conventional systems, the digital hairstyle transfer system 106 can replace the exposed region 416 with reasonable and photorealistic facial features. As mentioned above, in one or more embodiments, the digital hairstyle transfer system 106 synthesizes facial attributes within exposed region 416 of a source image to generate a reconstructed source image. In one or more embodiments, the digital hairstyle transfer system 106 modifies the exposed region 416 within the source image and utilizes a facial reconstruction model to generate a reconstructed source image that includes synthesized facial attributes in place of the exposed region 416. Furthermore, in some embodiments, the digital hairstyle transfer system 106 projects the reconstructed source image into a (reconstructed) source latent vector.

Figure 5:
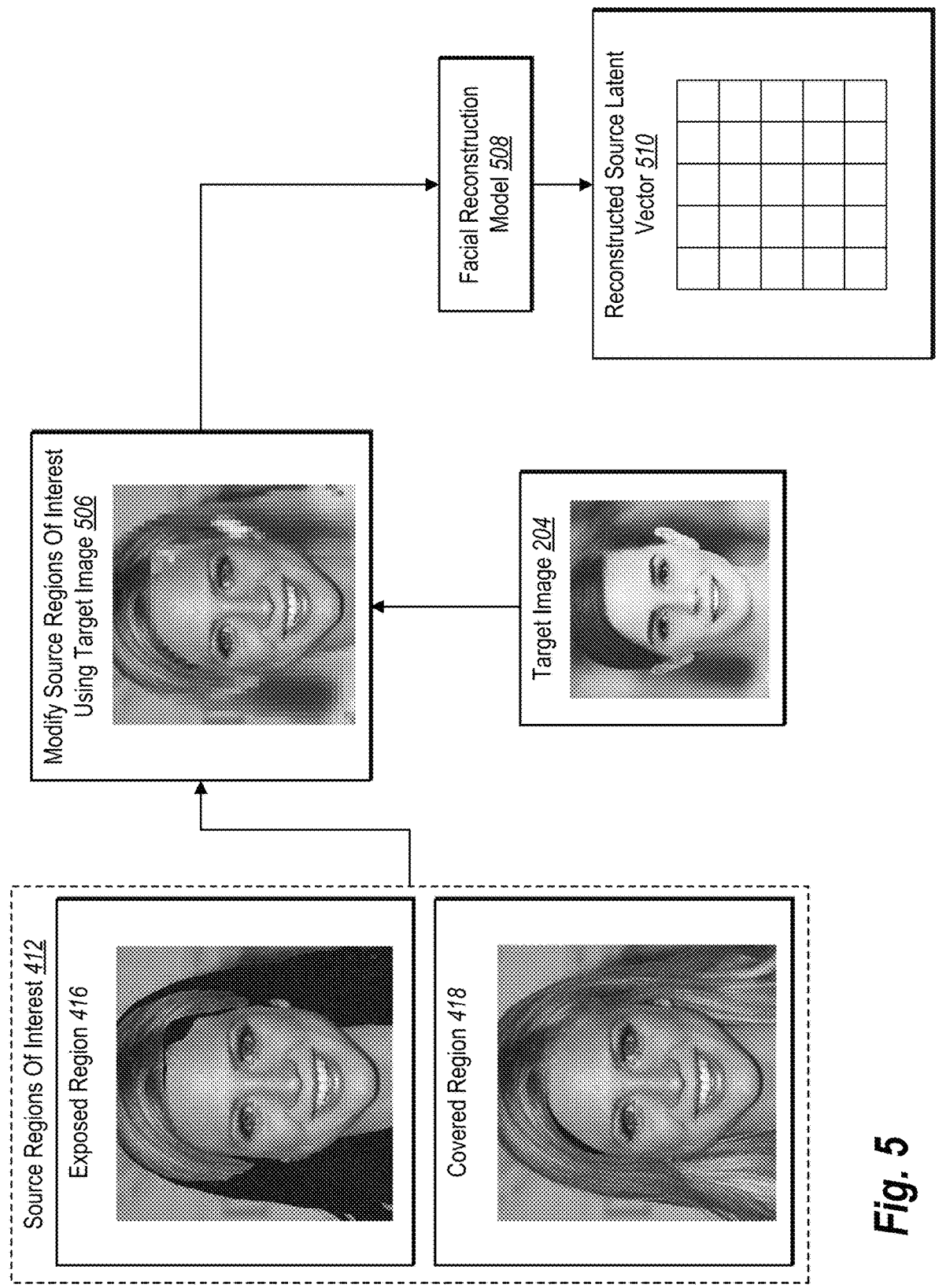
FIG. 5 illustrates a digital hairstyle transfer system generating a reconstructed source image and a reconstructed source latent vector in accordance with one or more embodiments.

For instance, FIG. 5 illustrates the digital hairstyle transfer system 106 generating a reconstructed source image and projecting the reconstructed source image into a reconstructed source latent vector. As shown in FIG. 5, the digital hairstyle transfer system 106 identifies non-overlapping regions (e.g., exposed region 416 and optionally covered region 418). Then, as illustrated in FIG. 5, the digital hairstyle transfer system 106 modifies the source image by modifying the exposed region 416 and optionally covered region 418 using the target image in an act 506. For instance, as shown in FIG. 5, the digital hairstyle transfer system 106 replaces the non-overlapping regions within the source image (e.g., exposed region 416 and optionally covered region 418) with corresponding pixels from the target image 204. Indeed, as illustrated in FIG. 5, the digital hairstyle transfer system 106 also modifies the replaced non-overlapping region within the source image by blurring the facial attributes from the target image 204 (e.g., to provide an obscured reference from which a facial reconstruction model reconstructs photorealistic facial attributes).

Subsequently, as illustrated in FIG. 5, the digital hairstyle transfer system 106 provides the modified source image (from the act 506) to a facial reconstruction model 508. Indeed, in some embodiments, the digital hairstyle transfer system 106 utilizes the facial reconstruction model 508 to reconstruct the modified source image such that a reconstructed (or synthesized) source image includes (or depicts) synthesized (photorealistic) facial attributes in place of the non-overlapping region within the source image. As an example, in reference to FIG. 5, the digital hairstyle transfer system 106 utilizes the facial reconstruction model 508 to synthesize a body part (e.g., an ear) or skin in place of the non-overlapping region.

Furthermore, as shown in FIG. 5, the digital hairstyle transfer system 106 receives a reconstructed source latent vector 510 from the facial reconstruction model 508 that corresponds to the reconstructed source image. Indeed, the reconstructed source latent vector 510 represents a depiction of the source image with the non-overlapping region(s) replaced by synthesized facial attributes. In certain instances, the digital hairstyle transfer system 106 receives (or generates) the reconstructed source image from the facial reconstruction model 508 and projects the reconstructed source image into a source latent vector utilizing a face-generative neural network in accordance with one or more embodiments. In some embodiments, the digital hairstyle transfer system 106 utilizes the reconstructed source latent vector 510 as the source latent vector for hairstyle transfer in accordance with one or more embodiments.

Although FIG. 5 illustrates the digital hairstyle transfer system 106 modifying the non-overlapping region(s) of a source image using a target image, the digital hairstyle transfer system 106 in some embodiments utilizes a variety of images to modify the non-overlapping region(s) of the source image. In particular, in some embodiments, the digital hairstyle transfer system 106 utilizes a default image from a template of default images that matches (or is similar) to the source image to replace non-overlapping region(s) of the source image with facial attributes depicted within the default image. Furthermore, in certain instances, the digital hairstyle transfer system 106 replaces the non-overlapping region(s) of the source image with facial attributes depicted within the default image and blurs the inserted facial attributes (at the non-overlapping regions) prior to providing the modified source image to a facial reconstruction model.

Additionally, although one or more embodiments illustrate the digital hairstyle transfer system 106 modifying non-overlapping region(s) of a source image using another image prior to reconstructing the source image, the digital hairstyle transfer system 106 in certain instances utilizes a facial reconstruction model with a source image that has the non-overlapping region(s) removed (e.g., erased). For example, the digital hairstyle transfer system 106 removes (or deletes) pixels corresponding to the non-overlapping region(s) within the source image. Then, in some embodiments, the digital hairstyle transfer system 106 provides the source image, with the non-overlapping region(s) removed, to a facial reconstruction model to generate a reconstructed source image (and reconstructed source latent vector) by reconstructing (or synthesize) facial attributes in place of the removed (or blank) non-overlapping regions within a source image.

In one or more embodiments, the digital hairstyle transfer system 106 utilizes a face-generative neural network based facial reconstruction model. For example, the digital hairstyle transfer system 106 utilizes a generative adversarial network based facial reconstruction model. In particular, in some embodiments, the digital hairstyle transfer system 106 utilizes a facial reconstruction model that reconstructs regions (or portions) of an image by using an encoder-decoder network that identifies how an obscured region (e.g., the non-overlapping region(s) of a source image) should be represented by observing other regions of the image (e.g., other facial attributes within the image). For instance, in some embodiments, as part of the reconstruction process, the facial reconstruction model projects the reconstructed source image (e.g., an iteration of the synthesized reconstructed source image) into a latent vector (e.g., using a face-generative neural network). In some embodiments, the digital hairstyle transfer system 106 utilizes a facial reconstruction model as described in U.S. application Ser. No. 16/944,452 filed Jul. 31, 2020, entitled Facial Reconstruction Network, the contents of which are herein incorporated by reference in their entirety.

Furthermore, in some embodiments, the digital hairstyle transfer system 106 utilizes a variety of facial reconstruction models to generate a reconstructed source image (or reconstructed source latent vector). For example, the digital hairstyle transfer system 106 utilizes facial reconstruction models that utilize approaches such as, but not limited to, deep learning (e.g., convolutional neural networks), context-aware fill approaches, and/or patch and curve tools. In some embodiments, the digital hairstyle transfer system 106 utilizes such facial reconstruction models to generate (or synthesize) a reconstructed source image that introduces facial attributes in place of the non-overlapping regions within a source image. Then, in one or more embodiments, the digital hairstyle transfer system 106 projects the reconstructed source image into a source latent vector in accordance with one or more embodiments.

In an alternative approach, in some embodiments, the digital hairstyle transfer system 106 identifies a non-overlapping region within a source image that should depict a background rather than a facial attribute and a non-overlapping region that should depict a facial attribute. In such embodiments, the digital hairstyle transfer system 106 utilizes a facial reconstruction model (in accordance with one or more embodiments) to reconstruct the source image to synthesize facial attributes in place of the regions (from the non-overlapping regions) that should depict a facial attribute as described above.

Furthermore, the digital hairstyle transfer system 106 optionally utilizes a separate image modification model to replace (or fill) the identified regions that should depict a background within the source image. For example, the digital hairstyle transfer system 106 utilizes a context aware fill approach to fill a background within a non-overlapping region of a source image. For example, in at least one embodiment, the digital hairstyle transfer system 106 utilizes a PatchMatch algorithm discussed in Connelly Barnes et al., "PatchMatch: A Randomized Correspondence Algorithm for Structural Image Editing," ACM Transactions on Graphics (Proc. SIGGRAPH), August 2009, which is incorporated herein by reference in its entirety. Furthermore, in some embodiments, the digital hairstyle transfer system 106 computes pixels to fill the exposed region 416 based on similar images. For example, the digital hairstyle transfer system 106 maps matching masks corresponding to the exposed region 416 from other images to realistically fill pixels. In at least one embodiment, digital hairstyle transfer system 106 utilizes techniques and approaches found in U.S. Patent Application No. US20170287123A1, "Content Aware Fill Based on Similar Images," filed on Jun. 14, 2017, the entirety of which is incorporated herein by reference.

In some instances, the digital hairstyle transfer system 106 identifies that there is no exposed region. In other words, the digital hairstyle transfer system identifies that there is no region of the source image that is covered by hair that will be exposed once the hairstyle of the target image is transferred to the source image. For example, the digital hairstyle transfer system 106 identifies that a source image depicts a hairstyle that is shorter (or smaller) than a hairstyle depicted within a target image. In such cases, the digital hairstyle transfer system 106 skips (does not utilize) the facial reconstruction model to reconstruct the source image and proceeds to project the source image into a source latent vector in accordance with one or more embodiments.

In one or more embodiments, the digital hairstyle transfer system 106 identifies that depictions of skin within the source image and target image are different. In such embodiments, the digital hairstyle transfer system 106 modifies the source and/or target image to resolve the differences in depicted skin tone. For instance, the digital hairstyle transfer system 106 utilizes a skin segmentation model to identify regions that depict skin within an image (e.g., the source and target image). Then, in one or more embodiments, the digital hairstyle transfer system 106 modifies regions that depict skin in the image by adjusting visual attributes of the depicted skin (e.g., hue, tone, saturation adjustments). In particular, in some embodiments, the digital hairstyle transfer system 106 modifies the regions that depict skin within the target image to match the depicted skin tone between the source image. For example, the digital hairstyle transfer system 106 utilizes an average skin tone from the regions that depict skin in the source image to match the depicted skin tone between the source and target image.

In some instances, the digital hairstyle transfer system 106 modifies the target image to match the skin tone of the source image (using the above described approach) prior to reconstructing non-overlapping regions of a source image in accordance with one or more embodiments. In one or more embodiments, the digital hairstyle transfer system 106 utilizes a patch of depicted skin from the source image that is within a threshold vicinity of the non-overlapping region of the source image (e.g., the region being replaced) to modify the skin tone depicted within the target image. For example, to generate a modified source image, the digital hairstyle transfer system 106 replaces non-overlapping regions of the source image with corresponding facial attributes of the modified target image (e.g., having the adjusted skin tone). Then, the digital hairstyle transfer system 106 utilizes the modified source image with a facial reconstruction model (in accordance with one or more embodiments) to generate a reconstructed source image (or a reconstructed source latent vector).

As mentioned above, in some embodiments, the digital hairstyle transfer system 106 projects an image into a latent vector. For instance, the digital hairstyle transfer system 106 utilizes a face-generative neural network to project an image into a latent vector within a latent vector space. In some instances, during the projection of the latent vector, the digital hairstyle transfer system 106 adjusts a latent vector (e.g., optimizes the latent vector) by utilizing a loss between a synthesized image from the latent vector and the original image.

As an example, the digital hairstyle transfer system 106 utilizes a face-generative neural network to project a source image into a source latent vector. Then, in certain embodiments, the digital hairstyle transfer system 106 synthesizes an image from the source latent vector and compares the synthesized image to the source image to determine a loss. Furthermore, in one or more embodiments, the digital hairstyle transfer system 106 utilizes the determined loss to adjust the source latent vector such that the source latent vector more accurately represents the source image. In other words, the digital hairstyle transfer system 106 utilizes the loss during inference rather than training. In other words, the digital hairstyle transfer system 106 back propagates the loss to the latent vector rather than back propagating the loss to update the parameters of the face-generative neural network.

Figure 6:
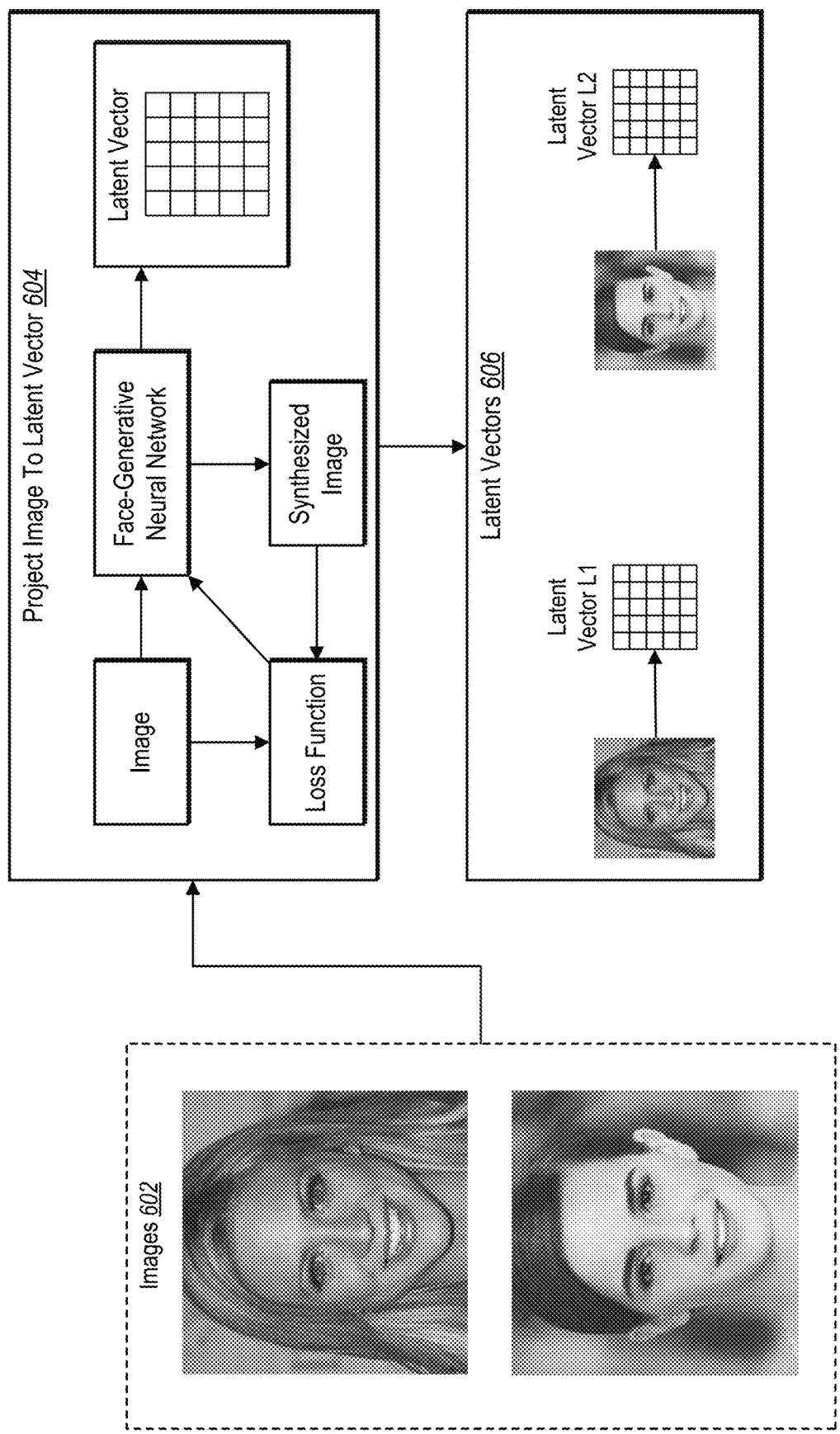
FIG. 6 illustrates a digital hairstyle transfer system projecting an image into a latent vector in accordance with one or more embodiments.

For instance, FIG. 6 illustrates the digital hairstyle transfer system 106 projecting images into latent vectors (e.g., while optimizing the latent vectors). As shown in FIG. 6, the digital hairstyle transfer system 106 utilizes a face-generative neural network to project an image into a latent vector in an act 604. In particular, as shown in FIG. 6, the digital hairstyle transfer system 106 utilizes an encoder of the face-generative neural network to encode an iteration of a latent vector for the image (e.g., projects the image into a latent vector). Then, as shown in FIG. 6, the digital hairstyle transfer system 106 utilizes a decoder of the face-generative neural network to generate an iteration of a synthesized image from the iteration of the latent vector.

Additionally, as shown in FIG. 6, the digital hairstyle transfer system 106 utilizes a loss function (e.g., an optimizer) to determine a loss between the iteration of the synthesized image and the input image (e.g., as a ground truth image). For example, the digital hairstyle transfer system 106 utilizes the determined loss to adjust and generate a subsequent iteration of the latent vector for the image (e.g., using back propagation). In one or more embodiments, as shown in FIG. 6, the digital hairstyle transfer system 106 iteratively uses the subsequent iterations of latent vectors to generate iterations of a synthesized image and losses between the iterations of the synthesized image and the input image.

Indeed, as illustrated in FIG. 6, the digital hairstyle transfer system 106 iteratively adjusts the latent vector until the loss function indicates that an iteration of the latent vector represents a threshold approximation of the input image. Once the iteration of the latent vector represents the threshold approximation of the input image, the digital hairstyle transfer system 106, in one or more embodiments, utilizes the latent vector as the projected latent vector (e.g., the latent vectors 606). For instance, as shown in FIG. 6, the digital hairstyle transfer system 106 projects the source and target images (from images 602) into the latent vector L1 (for the source image) and latent vector L2 (for the target image) (from latent vectors 606) by encoding and optimizing latent vectors for the images using a face-generative neural network in the act 604.

In one or more embodiments, the digital hairstyle transfer system 106 utilizes a face-generative neural network that is based on a generative adversarial network. For instance, the digital hairstyle transfer system 106 utilizes a generative adversarial network based face-generative neural network that is trained to generate (or synthesize) photorealistic images. Indeed, in certain instances, the digital hairstyle transfer system 106 utilizes a face-generative neural network that is trained on a dataset of facial images (e.g., Flickr-Faces-HQ dataset, CELEBA-HQ dataset) to generate facial images from latent vectors. In particular, the digital hairstyle transfer system 106 utilizes the face-generative neural network to utilize a (random) latent vector to synthesize a (random) facial image corresponding to that latent vector. In some embodiments, the digital hairstyle transfer system 106 utilizes a face-generative neural network based on a variety of neural network models such as, but not limited to, a GAN, a Deep Convolutional GAN (DCGAN), and/or a conditional GAN (cGAN).

In one or more embodiments, the digital hairstyle transfer system 106 utilizes a face-generative neural network that utilizes a mapping network to convert a random latent vector (e.g., a Z-space vector) to a latent vector that represents facial attributes (e.g., a D-space vector). Then, in some embodiments, the face-generative neural network (utilized by the digital hairstyle transfer system 106) uses a synthesis network to convert the latent vector that represents facial attributes to a generated an image. Indeed, in some embodiments, the face-generative neural network (utilized by the digital hairstyle transfer system 106) is trained using facial images to generate facial images (e.g., portrait images depicting a person with a hairstyle). As an example, in some embodiments, the digital hairstyle transfer system 106 utilizes a face-generative neural network as described by R. Abdal et al. in *A Style-Based StyleFlow: Attribute-conditioned Exploration of StyleGAN-Generated Images using Conditional Continuous Normalizing Flows*, arXiv: 2008.02401, (2020), the content of which is hereby incorporated by reference in its entirety. Another example of a face-generative neural network include that described by T. Karras et al. in *A Style-Based Generator Architecture for Generative Adversarial Networks*, In Proceedings of the IEEE Conference on Computer Vision and Pattern Recognition, pages 4401-4410, 2019, the content of which is hereby incorporated by reference in its entirety.

More specifically, the digital hairstyle transfer system 106 utilizes the face-generative neural network to project the source image into a first iteration of a source latent vector using an encoder network of the face-generative neural network. The digital hairstyle transfer system 106 then utilizes the decoder network of the face-generative neural network to decode the source latent vector into a first iteration of a synthesized source image. Furthermore, as mentioned above, the digital hairstyle transfer system 106 utilizes a loss function (e.g., an optimizer) to optimize the source latent vector projected from the source image. In particular, during an iteration, of the digital hairstyle transfer system 106 utilizes a loss function to determine a loss between the first iteration of a synthesized source image and the input image. The digital hairstyle transfer system 106 backpropagates the loss to the first iteration of the source latent vector to update the first iteration of the source latent vector to generate a second iteration of the source latent vector. The digital hairstyle transfer system 106 then iteratively repeats this process (e.g., decodes the second iteration of the source latent vector into a second synthesized source image, compares the second synthesized source image to the source image 402 to generate a loss, backpropagates the loss to update the second iteration of the source latent vector).

Furthermore, in one or more embodiments, the digital hairstyle transfer system 106 utilizes the loss function to adjust values of the latent vector for a threshold number of iterations until the loss function indicates that an iteration of the latent vector represents a threshold approximation of the input image. For instance, the digital hairstyle transfer system 106 compares the generated loss to a threshold approximation to determine if the determined loss satisfies the threshold approximation (e.g., the determined loss is less than or equal to a threshold loss).

Furthermore, in some instances, the digital hairstyle transfer system 106 identifies (or selects) the threshold number of iterations (e.g., learning rate) and/or the threshold approximation (e.g., an accuracy of the synthesized image compared to the input image) from an administrator device preference (e.g., a preference configured by an administrator and/or user of the digital hairstyle transfer system 106). Indeed, in some embodiments, the digital hairstyle transfer system 106 selects a threshold number of iterations and/or the threshold approximation based on the type of loss function and/or optimizer utilized within the face-generative neural network.

In some embodiments, the digital hairstyle transfer system 106 utilizes a variety of loss functions and/or optimizers to adjust (e.g., optimize) the latent vector. For example, the digital hairstyle transfer system 106 utilizes loss functions and/or optimizers such as, but not limited to, an Adam optimizer, a Broyden-Fletcher-Goldfarb-Shanno (BFGS) optimizer, and/or a limited-memory BFGS (LBFGS) optimizer. In addition, in one or more embodiments, the digital hairstyle transfer system 106 utilizes the loss function and/or optimizer (of the face-generative neural network) to determine a mean squared error loss (MSE loss) and/or a perceptual loss between an input image and the synthesized image generated from a latent vector based on input image. Indeed, in certain instances, the digital hairstyle transfer system 106 utilizes the MSE loss and/or perceptual loss between the input image and the synthesized image to determine if an iteration of the latent vector represents a threshold approximation of the input image. In some embodiments, the digital hairstyle transfer system 106 utilizes a variety of loss values such as, but not limited to, quadratic loss, L2 loss, and/or learned perceptual image patch similarities (LPIPS).

Furthermore, in one or more embodiments, the digital hairstyle transfer system 106 utilizes an iteration of a latent vector from the face-generative neural network that represents a threshold approximation of the input image as the projected latent vector to utilize in a hairstyle transfer. In particular, in some instances, the digital hairstyle transfer system 106 obtains the (optimized) latent vector from the face-generative neural network that is projected from an input image to utilize in the hairstyle transfer. For example, the digital hairstyle transfer system 106 projects a source image into a latent vector by inputting the source image into the face-generative neural network to obtain an optimized latent vector based on the input source image as the source latent vector. Likewise, in one or more embodiments, the digital hairstyle transfer system 106 projects a target image into a latent vector. Then, in one or more embodiments, the digital hairstyle transfer system 106 utilizes the projected source latent vector and the projected target latent vector to generate a hairstyle transfer latent vector (to transfer a hairstyle depicted within the target image onto a person depicted within the source image).

As mentioned above, in some embodiments, the digital hairstyle transfer system 106 generates a hairstyle-latent vector by selectively combining a source latent vector and a target latent vector. In some instances, the digital hairstyle transfer system 106 selectively combines the source latent vector and the target latent vector based on activation values that control hairstyle from the source latent vector and/or the target latent vector. Indeed, in one or more embodiments, the digital hairstyle transfer system 106 identifies activation values (for a source image and/or a target image) that control hair from latent vectors (corresponding to the source image and/or the target image).

For example, in order to determine activation values that control hairstyle (or hair) attributes from a latent vector, the digital hairstyle transfer system 106 modifies an image that depicts a person with hair by using noise pixels in place of the hair (or hairstyle) depicted within the image (e.g., based on segmented or identified hair). Then, in one or more embodiments, the digital hairstyle transfer system 106 projects the modified image (having noise pixels) into a latent vector. In certain instances, the digital hairstyle transfer system 106 compares the latent vector of the modified image to a latent vector of the original image to determine activation values that control hair in the latent vector of the original image (e.g., by identifying a difference, divergence, or distortion between the latent vectors). For example, the digital hairstyle transfer system 106 quantifies the contribution of latent tensor elements in determining hair or hairstyle attributes (from between the latent vector of the image and the latent vector of the modified image).

Figure 7:
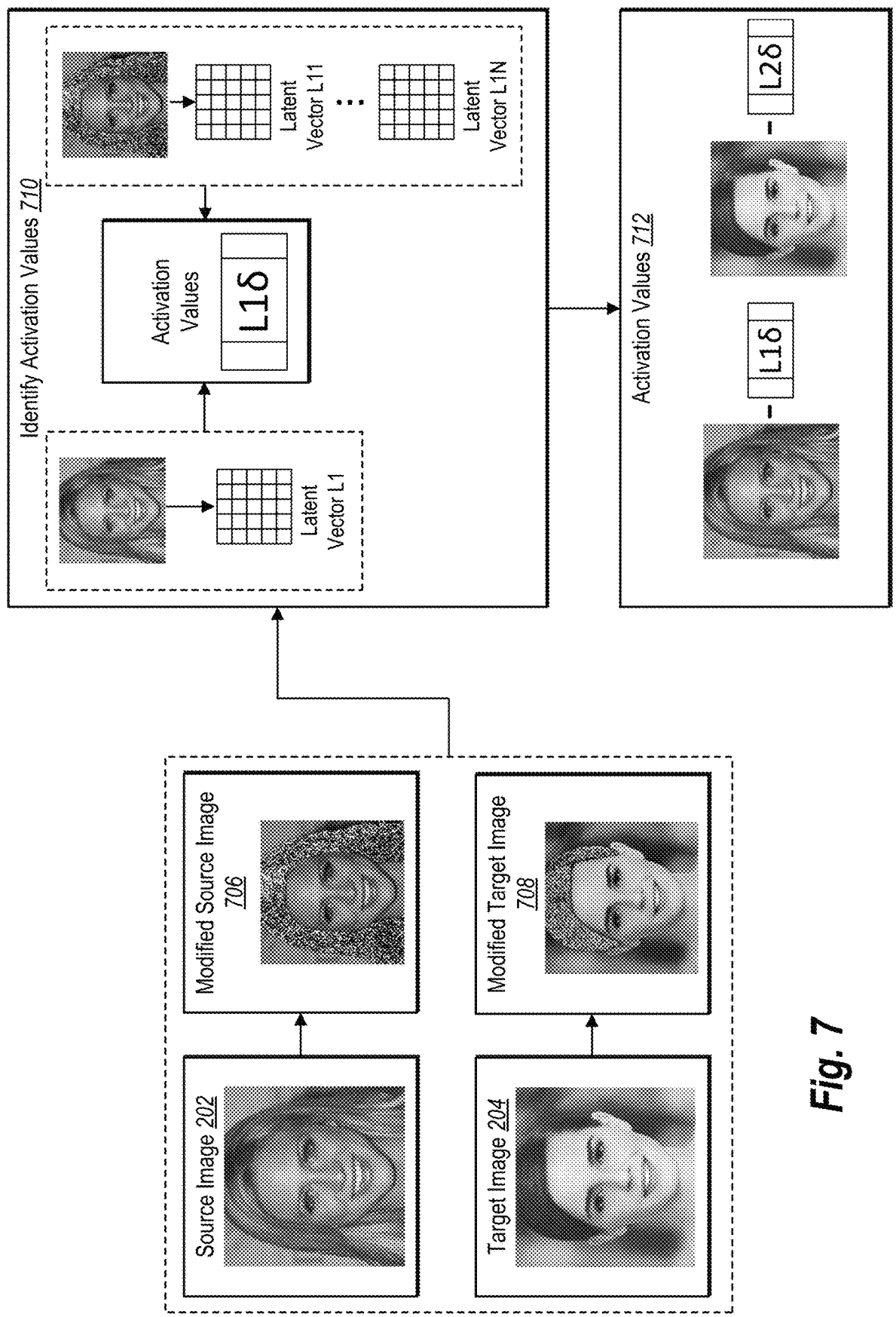
FIG. 7 illustrates a digital hairstyle transfer system determining activation values that control hairstyle from latent vectors in accordance with one or more embodiments.

For instance, FIG. 7 illustrates the digital hairstyle transfer system 106 determining activation values that control hairstyle from a source latent vector and a target latent vector. As shown in FIG. 7, the digital hairstyle transfer system 106 modifies a source image 202 to generate a modified source image 706 by introducing noise pixels in place of a hairstyle (or hair) depicted within the source image 202. In addition, as also illustrated in FIG. 7, the digital hairstyle transfer system 106 modifies a target image 204 to generate a modified target image 708 using noise pixels in place of a hairstyle (or hair) depicted within the target image 204. For instance, the digital hairstyle transfer system 106 modifies an image by identifying a hairstyle (or hair) depicted within the image (in accordance with one or more embodiments herein) and replacing pixels corresponding to the identified hair with noise pixels (e.g., pixels that fill an area of an image with obscure and/or non-descriptive attributes such as, but not limited to, blank space, visual static, random variations of color, and/or a singular color).

Furthermore, as shown in FIG. 7, the digital hairstyle transfer system 106 identifies activation values in an act 710. In particular, as shown in the act 710 of FIG. 7, the digital hairstyle transfer system 106 projects the source image into a latent vector L1 and the modified source image into latent vectors L11-L1N (in accordance with one or more embodiments). Then, as shown in FIG. 7, the digital hairstyle transfer system 106 identifies activation values L1δ for the source latent vector L1 of the source image (in the act 710) by comparing the source latent vector L1 to the modified source latent vectors L11-L1N.

In particular, in one or more embodiments, the activation values L1δ include a vector having the same vector size as the latent vector L1 and/or the modified source latent vectors L11-L1N. For instance, the activation values L1δ indicate the presence (or contribution) of hairstyle (or hair) features (or attributes) at a given element of the latent vector L1. Indeed, in one or more instances, by using a source latent vector L1 that includes hair features and a modified source latent vector(s) L11-L1N with hair features removed, the digital hairstyle transfer system 106 identifies activation values L1δ that control hairstyle (or hair) attributes between the two latent vectors.

Additionally, as shown in FIG. 7, the digital hairstyle transfer system 106 generates (or obtains) the activation values 712 (from the act 710). For example, as illustrated in FIG. 7, the digital hairstyle transfer system 106 identifies the activation values L1δ for the source image 202 (as shown in the act 710). Furthermore, as shown in FIG. 7, the digital hairstyle transfer system 106 identifies the activation values L2δ for the target image 204 (e.g., using a latent vector L2 corresponding to the target image 204 and latent vector(s) L21-L2N corresponding to the modified target image 708 in accordance with one or more embodiments).

In one or more embodiments, the digital hairstyle transfer system 106 projects an image that is modified to include noise pixels in place of regions depicting a hairstyle (or hair) into a latent vector for that modified image using a face-generative neural network in accordance with one or more embodiments (e.g., as described above). In addition, in some instances, the digital hairstyle transfer system 106 projects the modified image into multiple latent vectors by repeatedly generating latent vectors (e.g., as illustrated in FIG. 7). In some embodiments, the digital hairstyle transfer system 106 projects a single modified image into a single latent vector.

Furthermore, as mentioned above, in one or more embodiments, the digital hairstyle transfer system 106 compares the latent vectors of an image depicting a person with hair style and a modified image (e.g., with regions depicting a hairstyle replaced with noise pixel) to determine (activation) feature values. In one or more instances, the digital hairstyle transfer system 106 identifies (or determines) a divergence (or distortion) between the latent vector corresponding to the image and the one or more latent vectors corresponding to the modified image. For example, in reference to the source image of FIG. 7, the digital hairstyle transfer system 106 identifies (or determines) a difference (e.g., an absolute difference) between the latent vector L1 of the source image 202 and the latent vector(s) L11-L1N of the modified source image 706 as the activation values for a hairstyle (or hair) corresponding to the source image 202. In some embodiments, the digital hairstyle transfer system 106 utilizes an average difference (e.g., an average absolute difference) between the latent vector L1 of the source image 202 and the latent vectors L11-L1N of the modified source image 706.

For instance, the digital hairstyle transfer system 106 determines (or identifies) activation values $Lk_δ$ for a $k^{th}$ image (e.g., $L1_δ$ for the source image and $L2_δ$ for the target image) by comparing latent vector Lk of an image (e.g., L1 for a latent vector corresponding to the source image and L2 for a latent vector corresponding to the target image) with latent vectors $Lk_i$ of modified image(s) of the image (e.g., $L1_1$-$L1_i$ for latent vectors corresponding to a modified source image with noise pixels and $L2_1$-$L2i$ for latent vectors corresponding to a modified target image with noise pixels). Indeed, in one or more embodiments, the digital hairstyle transfer system 106 determines activation values $Lk_δ$ with a n number of latent vectors $Lk_i$ projected from a modified image (e.g., from noise pixel substitution) by using the following algorithm:

$$Lk_δ = \frac{\sum_{1 \text{ to } n}(Lk - Lk_i)}{n}.$$

For example, by utilizing the algorithm above, the digital hairstyle transfer system 106 determines activation values L1δ for a source image and activation values L2δ for a target image.

In addition, in some embodiments, the digital hairstyle transfer system 106 normalizes determined activation values. For instance, the digital hairstyle transfer system 106 normalizes determined activation values to standardize the activation values of the latent vectors of the source image and the activation values of the latent vectors of the target image (in relation to each other). In particular, in one or more embodiments, the digital hairstyle transfer system 106 normalizes the activation values to a standardized interval (e.g., an interval of [0,1] for the activation values) that is similar between the latent vectors of the source image and latent vectors of the target image. For example, the digital hairstyle transfer system 106 normalizes an activation value $Lk_δ$ (of a $k^{th}$ image) for a latent vector Lk of size m and having i elements by utilizing the following algorithm:

$$Lk_δ = \left\{ \frac{Lk_{δ_i}}{\max(Lk_{δ_i})} \forall\, i = [1, m],\ i \in \mathbb{N} \right\}.$$

As mentioned above, in one or more embodiments, the digital hairstyle transfer system 106 generates a hairstyle-transfer latent vector by selectively combining a source latent vector (from a source image) and a target latent vector (from a target image). For instance, the digital hairstyle transfer system 106 selectively combines (or fuses) the source latent vector and the target latent vector using identified activation values that control hairstyles (or hair) in the source image and/or target image. In some embodiments, the digital hairstyle transfer system 106 selectively combines the latent vectors by replacing features (or elements) from the source latent vector corresponding to (normalized) activation values that control for the hairstyles within the source and/or target image with features (or elements) from a target latent vector. In particular, in some instances, the digital hairstyle transfer system 106 selectively combines the latent vectors by splicing the latent vectors together using the (normalized) activation values that control hairstyle (or hair) in the source and/or target image to generate the hairstyle-transfer latent vector. For instance, the digital hairstyle transfer system 106 generates a hairstyle-transfer latent vector that encodes features from the source latent vector with the hairstyle (or hair) features from the target latent vector.

Figure 8:
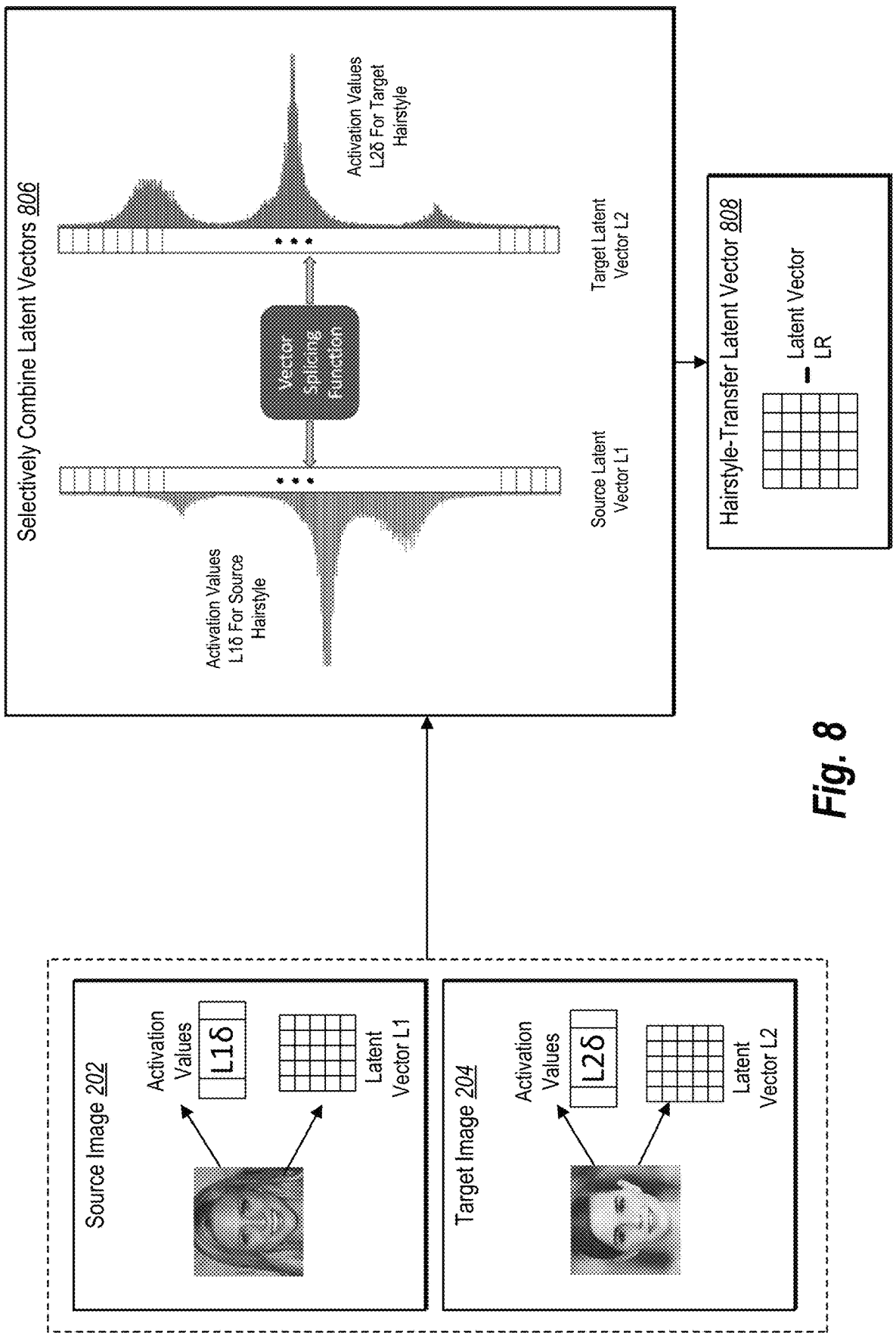
FIG. 8 illustrates a digital hairstyle transfer system generating a hairstyle-transfer latent vector in accordance with one or more embodiments.

For instance, FIG. 8 illustrates the digital hairstyle transfer system 106 generating a hairstyle-transfer latent vector by selectively combining latent vectors corresponding to a source image and a target image. As shown in FIG. 8, the digital hairstyle transfer system 106 determines a latent vector L1 and activation values L1δ for a source image 202 (in accordance with one or more embodiments). In addition, as also shown in FIG. 8, the digital hairstyle transfer system 106 determines a latent vector L2 and activation values L2δ for a target image 204 (in accordance with one or more embodiments).

Then, as illustrated in FIG. 8, the digital hairstyle transfer system 106 selectively combines the latent vectors (e.g., the source latent vector L1 and the target latent vector L2) in an act 806. In particular, as shown in FIG. 8, the digital hairstyle transfer system 106 identifies locations at which activation values L2δ (corresponding to the target image hairstyle) and/or activation values L1δ (corresponding to the source image hairstyle) effect the source latent vector L1 and the target latent vector L2. For instance, in some embodiments, the digital hairstyle transfer system 106 replaces elements of the source latent vector L1 with elements of the target latent vector L2 when the activation values L2δ (corresponding to the target image hairstyle) and/or the activation values L1δ (corresponding to the source image hairstyle) are present (or influential) for a given element of the latent vectors L1 and L2. Indeed, as shown in FIG. 8, by utilizing the vector splicing function to selectively combine the source latent vector L1 and the target latent vector L2 based on the activation values L1δ and L2δ, the digital hairstyle transfer system 106 generates a hairstyle-transfer latent vector 808 (e.g., latent vector LR).

For instance, to replace elements of the source latent vector L1 with elements of the target latent vector L2, the digital hairstyle transfer system 106 selectively combines the source latent vector L1 and the target latent vector L2 by splicing the latent vectors L1 and L2 based on the presence of activation values that control hairstyle (or hair) attributes (in the source image and/or target image). In one or more embodiments, the digital hairstyle transfer system 106 selectively combines the latent vectors L1 and L2 by subtracting actual values of the latent vector L2 from the latent vector L1. For instance, by doing so, the digital hairstyle transfer system 106 transfers features from the target latent vector L2 to the source latent vector L1 using the presence of activation values that control hair (from the latent vectors L1 and L2).

For instance, the digital hairstyle transfer system 106 combines the source activation values L1δ, the target activation values L2δ, and the values of the source latent vector L1 and the target latent vector L2 to generate a hairstyle-transfer latent vector. Indeed, in one or more embodiments, the digital hairstyle transfer system 106 generates a hairstyle-transfer latent vector from a source latent vector L1, a target latent vector L2, source activation values L1δ, and target activation values L2δ for an $i^{th}$ element of the latent vectors L1 and L2 by utilizing the following algorithm:

$$f(L1,L1_\delta,L2,L2_\delta) = \{l1_{\delta,i} * l2_{\delta,i} * (l2_i - l1_i) \forall l1_{\delta,i} \in L1_\delta, l2_{\delta,i} \in L2_\delta, l1_i \in L1, l2_i L2\}.$$

By utilizing the algorithm above, in one or more embodiments, the digital hairstyle transfer system 106 generates a resulting hairstyle-transfer latent vector that corresponds to a hairstyle represented within a target latent vector (of a target image) being superimposed on the hairstyle depicted within a source vector (of a source image). In particular, as previously mentioned, the digital hairstyle transfer system 106 generates the hairstyle-transfer latent vector to include values that represent visual (and/or other) attributes of a source image while having visual (and/or other) attributes of a hairstyle depicted in the target image.

As mentioned above, in one or more embodiments, the digital hairstyle transfer system 106 generates a transferred hairstyle image from a hairstyle-transfer latent vector. For example, the transferred hairstyle image depicts a person depicted within a first image (e.g., a source image) with a hairstyle depicted within a second image (e.g., a target image). In one or more embodiments, the digital hairstyle transfer system 106 generates a transferred hairstyle image by utilizing a face-generative neural network to synthesize a hairstyle-transfer latent vector.

Figure 9:
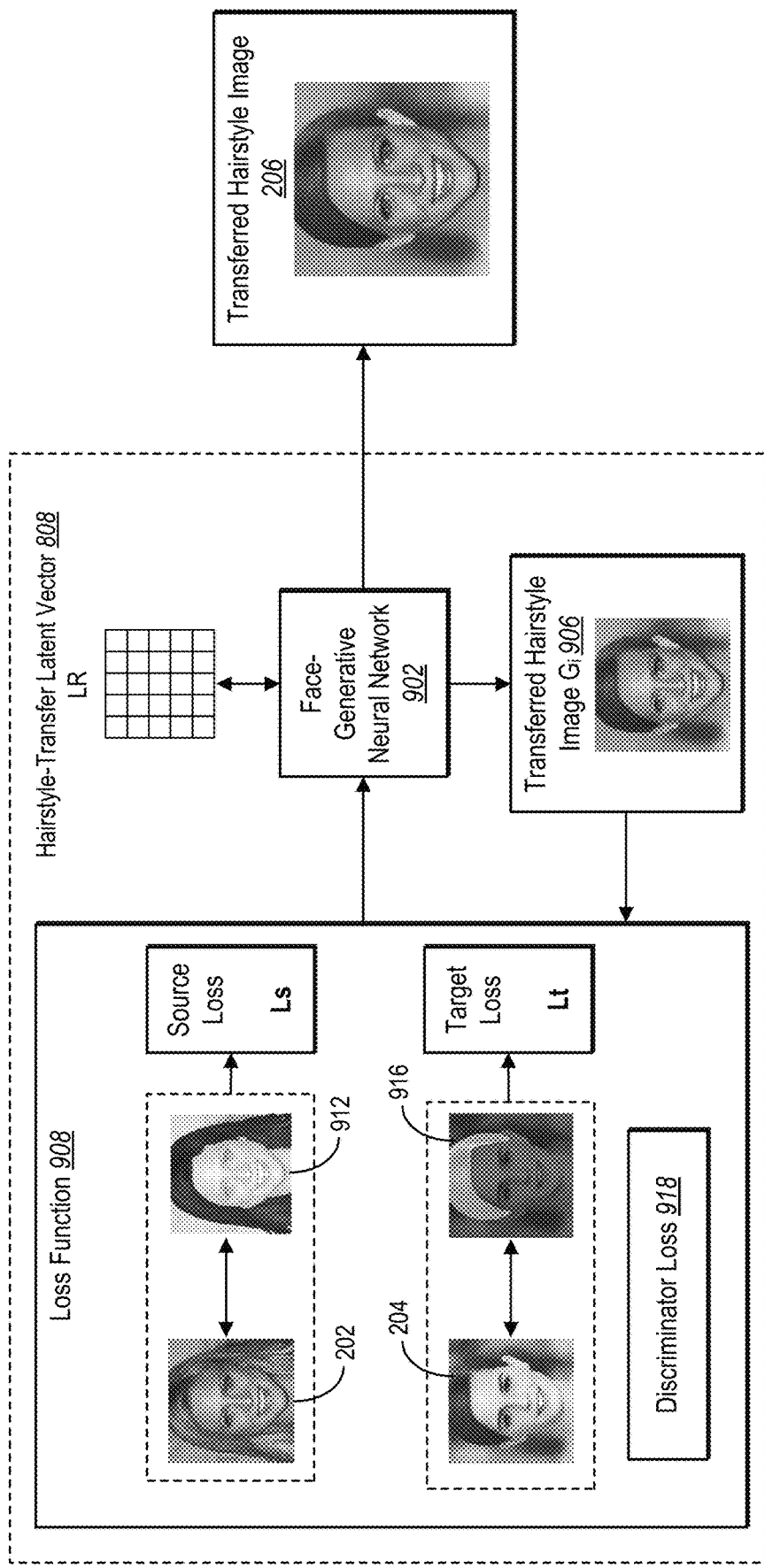
FIG. 9 illustrates a digital hairstyle transfer system generating a transferred hairstyle image in accordance with one or more embodiments.

For instance, FIG. 9 illustrates the digital hairstyle transfer system 106 generating a transferred hairstyle image from a hairstyle-transfer latent vector that corresponds to a source image and target image. In particular, as shown in FIG. 9, the digital hairstyle transfer system 106 utilizes a face-generative neural network 902 to synthesize a hairstyle-transfer latent vector 808 (e.g., latent vector LR) to generate a transferred hairstyle image 906. Indeed, as shown in FIG. 9, the generated transferred hairstyle image 906 depicts a person depicted within a source image (e.g., source image 910) with a hairstyle from (or depicted from) a target image (e.g., target image 914).

In some embodiments, the digital hairstyle transfer system 106 refines a hairstyle-transfer latent vector to accurately generate a transferred hairstyle image (e.g., an improved quality or texture quality for the transferred hairstyle image). In particular, in one or more embodiments, the digital hairstyle transfer system 106 refines a hairstyle-transfer latent vector to reduce (or decrease) a loss corresponding to the hairstyle-transfer latent vector such that the hairstyle-transfer latent vector accurately represents visual attributes of an image depicting a person depicted within a source image while having a hairstyle depicted within a target image. In order to refine a hairstyle-transfer latent vector, in one or more embodiments, the digital hairstyle transfer system 106 adjusts the hairstyle-transfer latent vector utilizing a loss determined by comparing a transferred hairstyle image 906 generated from the hairstyle-transfer latent vector to regions of a source image and/or a target image.

For example, the digital hairstyle transfer system 106 utilizes conditional projection within a face-generative neural network to refine (or adjust) a hairstyle-transfer latent vector for accuracy. In some embodiments, the digital hairstyle transfer system 106 iteratively adjusts the hairstyle-transfer latent vector utilizing a variety of losses that are determined by comparing an iteration of a transferred hairstyle image 906 generated from the hairstyle-transfer latent vector (using the face-generative neural network) and one or more image masks from a source image and/or target image. For instance, the digital hairstyle transfer system 106 utilizes a loss function that determines a (combined) loss from at least one or more of a source image mask (e.g., a face mask), a target image mask (e.g., a hairstyle mask), and a discriminator loss.

Indeed, FIG. 9 illustrates the digital hairstyle transfer system 106 iteratively adjusting a hairstyle-transfer latent vector by utilizing one or more losses with a face-generative neural network (e.g., conditional projection). As shown in FIG. 9, the digital hairstyle transfer system 106 utilizes the face-generative neural network 902 to synthesize the hairstyle-transfer latent vector 808 and generate an iteration of a transferred hairstyle image G 906. Then, as illustrated in FIG. 9, the digital hairstyle transfer system 106 utilizes the iteration of the transferred hairstyle image G 906 with a loss function 908 to determine a loss.

In particular, as illustrated in FIG. 9, the digital hairstyle transfer system 106 utilizes a combination of multiple losses within the loss function 908 to determine a loss. For example, as shown in FIG. 9, the digital hairstyle transfer system 106 compares the iteration of the transferred hairstyle image G 906 with a face mask 912 from the source image 910 (e.g., a set of pixels that account for a face depicted in the source image 910) to determine a source loss $L_s$. In addition, as shown in FIG. 9, the digital hairstyle transfer system 106 compares the iteration of the transferred hairstyle image G 906 with a hairstyle mask 916 from the target image 914 (e.g., a set of pixels that account for a hairstyle depicted in the target image 914) to determine a target loss $L_t$. Moreover, as shown in FIG. 9, the digital hairstyle transfer system 106 also determines a discriminator loss 918 for the iteration of the transferred hairstyle image $G_i$ 906. In one or more embodiments, the digital hairstyle transfer system 106 combines the source loss $L_s$, the target loss $L_t$, and the discriminator loss 918 as the determined loss for the loss function 908.

Subsequently, as shown in FIG. 9, the digital hairstyle transfer system 106 utilizes the determined loss from the loss function 908 to update or revise the hairstyle-transfer latent vector 808 (e.g., via back propagation). Furthermore, as illustrated in FIG. 9, the digital hairstyle transfer system 106 iteratively utilizes the adjusted hairstyle-transfer latent vector 808 to iteratively generate a subsequent iteration of the transferred hairstyle image G 906 and determine a subsequent loss from the loss function 908 using the subsequent iteration of the transferred hairstyle image G 906.

In particular, in one or more embodiments, the digital hairstyle transfer system 106 utilizes the subsequent loss from the loss function 908 to adjust the hairstyle-transfer latent vector 808. Indeed, in one or more embodiments, the digital hairstyle transfer system 106 iteratively adjusts the hairstyle-transfer latent vector 808 until the loss function 908 indicates that an iteration of the hairstyle-transfer latent vector 808 represents a threshold approximation of a transferred hairstyle image accounting for the source image and target image (e.g., due to a minimized loss or a loss that satisfies a threshold loss). Then, in some embodiments, the digital hairstyle transfer system 106 utilizes the face-generative neural network 902 to synthesize the iteration of the hairstyle-transfer latent vector 808 (determined to represent the threshold approximation of the transferred hairstyle image) to generate a transferred hairstyle image 206.

In one or more embodiments, the digital hairstyle transfer system 106 determines the source loss $L_s$ by utilizing a face mask corresponding to a source image. In particular, in one or more instances, the digital hairstyle transfer system 106 identifies (or segments) a region within the source image that depicts a face (e.g., facial attributes). For instance, the digital hairstyle transfer system 106 generates a face mask from the source image by including pixels of the source image that correspond to the region depicting the face while ignoring (or removing) pixels of the source image that correspond to a region that depicts hair and/or a background. Then, in some embodiments, the digital hairstyle transfer system 106 compares an iteration of a generated transferred hairstyle image and the source image for the pixels present (or allowed) within the face mask. Indeed, in one or more embodiments, the digital hairstyle transfer system 106 determines an MSE, perceptual, and/or LPIPS loss (as described above) for the source loss $L_s$.

Furthermore, in some embodiments, the digital hairstyle transfer system 106 determines the target loss $L_t$ by utilizing a hairstyle mask corresponding to a target image. For instance, the digital hairstyle transfer system 106 identifies (or segments) a region within the target image that depicts a hairstyle (or hair). Moreover, in certain instances, the digital hairstyle transfer system 106 generates a hairstyle mask from the target image by including pixels of the target image that correspond to the region depicting a hairstyle (or hair) while ignoring (or removing) pixels of the target image that correspond to a region that depicts a face (e.g., facial attributes) and/or a background. Subsequently, in some embodiments, the digital hairstyle transfer system 106 compares an iteration of a generated transferred hairstyle image and the target image for the pixels present (or allowed) within the hairstyle mask. Furthermore, in some instances, the digital hairstyle transfer system 106 determines an MSE, perceptual, and/or LPIPS loss (as described above) for the target loss $L_t$.

Additionally, in certain instances, the digital hairstyle transfer system 106 determines the discriminator loss 918. In particular, the digital hairstyle transfer system 106 utilizes a discriminator within the face-generative neural network to determine a discriminator loss. For instance, the digital hairstyle transfer system 106 utilizes a discriminator that functions as a classifier within the face-generative neural network to classify a digital image portraying a person (e.g., a portrait image) as real data or synthesized data that is generated by the face-generative neural network (e.g., classify between real images and synthesized images). Indeed, in one or more embodiments, the digital hairstyle transfer system 106 utilizes the discriminator loss to indicate whether the generated transferred hairstyle image from the face-generative neural network is a real image or a synthesized (e.g., fake) image (e.g., to adjust the hairstyle-transfer latent vector to produce a more photorealistic image or a visually consistent image). In some instances, the digital hairstyle transfer system 106 utilizes the discriminator loss to avoid low facial saliency regions within a face-generative neural network.

In some embodiments, the digital hairstyle transfer system 106 generates an ignore mask. For example, the digital hairstyle transfer system 106 generates an ignore mask from a non-overlapping region between a hairstyle mask from a source image and a hairstyle mask from a target image (e.g., an exposed region as described above). In one or more embodiments, the digital hairstyle transfer system 106 utilizes the ignore mask with a facial reconstruction model (e.g., as described above) to determine a loss between a generated transferred hairstyle image and a reconstructed source image (e.g., a source image that includes synthesized facial attributes in place of non-overlapping regions as described above) for the pixels present (or allowed) within the ignore mask. In one or more embodiments, the digital hairstyle transfer system 106 utilizes the determined loss between the generated transferred hairstyle image and a reconstructed source image to adjust the hairstyle-transfer latent vector.

Moreover, in some embodiments, the digital hairstyle transfer system 106 backpropagates the one or more determined losses to adjust the hairstyle-transfer latent vector. In some instances, the digital hairstyle transfer system 106 combines the source loss $L_s$, the target loss $L_t$, and/or the discriminator loss 918 to generate a combined loss (for backpropagation). For example, the digital hairstyle transfer system 106 generates a combined loss by utilizing a summation of the source loss $L_s$, the target loss $L_t$, and/or the discriminator loss 918 (e.g., adding the losses). In one or more additional embodiments, the digital hairstyle transfer system 106 combines the losses by multiplying the source loss $L_s$, the target loss $L_t$, and/or the discriminator loss 918 and/or taking a summation of the losses after applying weights to the source loss $L_s$, the target loss $L_t$, and/or the discriminator loss 918 (e.g., a weight based on a preferred prioritization between the face mask of the source image and/or hairstyle mask of the target image).

As mentioned above, in one or more embodiments, the digital hairstyle transfer system 106 utilizes post processing approaches on a generated transferred hairstyle image to preserve facial attributes from a source image within the generated transferred hairstyle image. For instance, the digital hairstyle transfer system 106 modifies the generated transferred hairstyle image by utilizing a blending effect between the source image and the transferred hairstyle image. In particular, in one or more embodiments, the digital hairstyle transfer system 106 utilizes a blending effect between the source image and the transferred hairstyle image to preserve regions of the source image that depicts facial attributes within the transferred hairstyle image.

Figure 10:
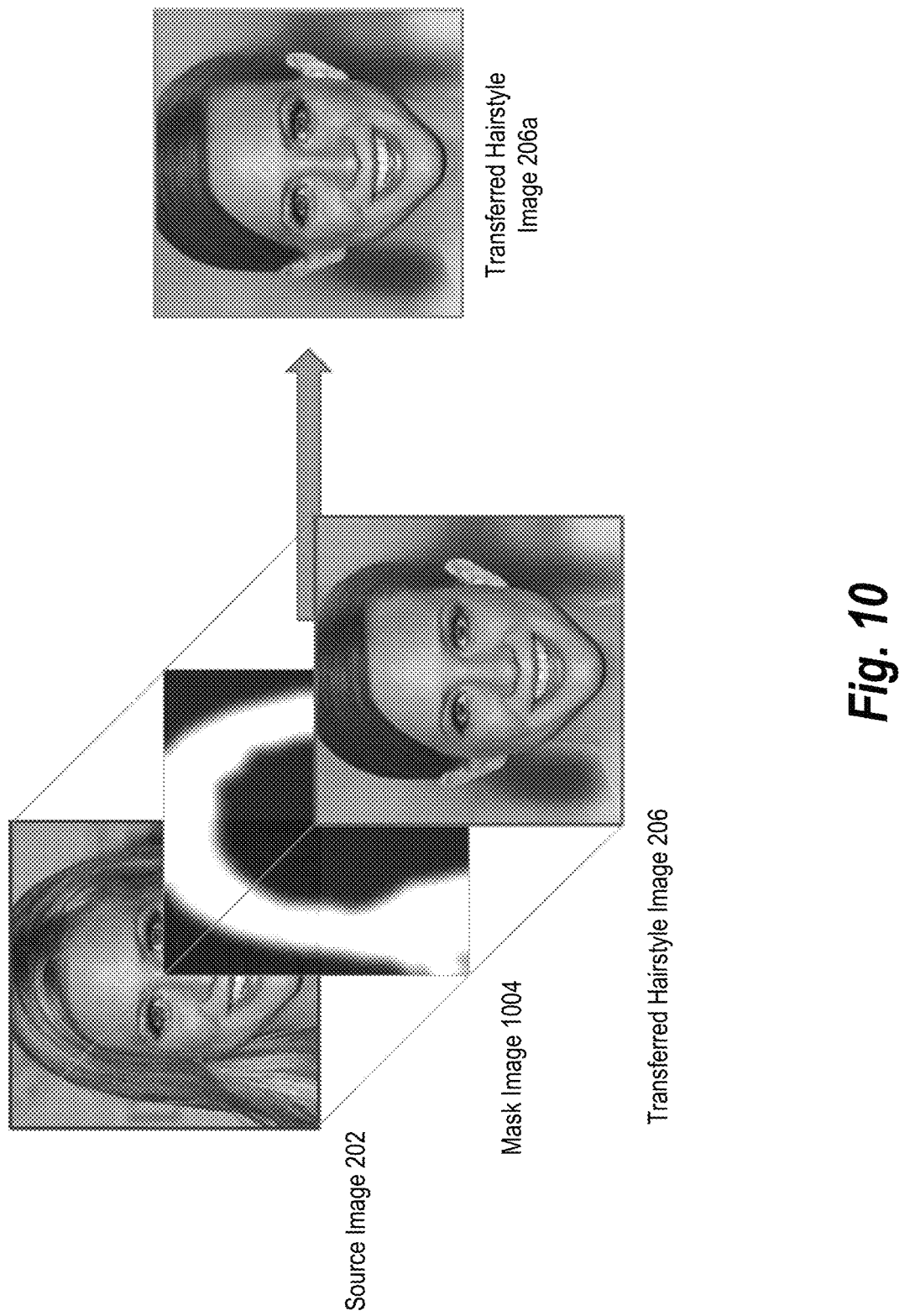
FIG. 10 illustrates a digital hairstyle transfer system modifying a transferred hairstyle image utilizing blending effects in accordance with one or more embodiments.

For example, FIG. 10 illustrates the digital hairstyle transfer system 106 utilizing post processing approaches on a generated transferred hairstyle image to preserve facial attributes from a source image within the generated transferred hairstyle image. As shown in FIG. 10, the digital hairstyle transfer system 106 determines a mask image 1004 that identifies a union of a source hair map 408 (e.g., a hairstyle mask for the source image as described in FIG. 4) and a target hair map 410 (e.g., a hairstyle mask for the target image as described in FIG. 4). In particular, as shown in FIG. 10, the digital hairstyle transfer system 106 blends regions of source image 202 into the transferred hairstyle image 206 that are outside of the image mask 1004. By doing so, as illustrated in FIG. 10, the digital hairstyle transfer system 106 incorporates facial attributes depicted in the original source image 202 into the transferred hairstyle image 206 for regions that are not superimposed (or modified) for the hairstyle transfer between the target image and the source image (e.g., regions outside the image mask 1004) to generate a final transferred hairstyle image 206a.

In one or more embodiments, the digital hairstyle transfer system 106 determines the image mask 1004 by selecting a set of pixels from a source image that correspond to both a source hair map 408 that identifies depictions of hair within the source image and a source region R2 that identifies depictions of hair within a target image. Moreover, in some instances, the digital hairstyle transfer system 106 utilizes the image mask 1004 to filter regions of the source image that are irrelevant to the transfer of a hairstyle from a target image to a source image. For instance, the digital hairstyle transfer system 106 utilizes the image mask 1004 to modify regions of a transferred hairstyle image that are not transferred from the target image.

Furthermore, as previously mentioned, the digital hairstyle transfer system 106 blends regions of a source image into a transferred hairstyle image that are outside of the hair segments of both the source image and target image (e.g., the image mask 1004). In some embodiments, the digital hairstyle transfer system 106 blends the source image into the transferred hairstyle image utilizing a feathering effect. In particular, in reference to FIG. 10, the digital hairstyle transfer system 106 utilizes a feathering effect to provide a smooth transition between the edges of the image mask 1004 and the generated transferred hairstyle image while blending in regions of the source image into the transferred hairstyle image that are further away from the edges of the image mask 1004. In some embodiments, the image mask 1004 is extended by a threshold number of pixels to include a transition region from a generated transferred hairstyle image (e.g., to include a threshold number of pixels from an edge of the transferred target hairstyle) to produce a more accurate transition between the edges of the image mask 1004 and the generated transferred hairstyle image when blending the source image with the generated transferred hairstyle image.

In one or more embodiments, the digital hairstyle transfer system 106 utilizes a variety of image blending effects to blend regions of a source image into a transferred hairstyle image that are outside of the hair segments of both the source image and target image. For instance, in some embodiments, the digital hairstyle transfer system 106 utilizes a variety blending effects such as, but not limited to, feathering, contrast blending, color blending, brightness blending, and/or additive blending. Indeed, in some instances, the digital hairstyle transfer system 106 utilizes multiple blending effects to blend regions of a source image into a transferred hairstyle image that are outside of the hair segments of both the source image and target image.

By utilizing a blending effect to blend regions of a source image into a transferred hairstyle image that are outside of the hair segments of both the source image and target image (e.g., the image mask 1004), the digital hairstyle transfer system 106 generates a transferred hairstyle image that preserves facial attributes from a source image within the generated transferred hairstyle image while portraying a hairstyle from a target image. In particular, in some instances, the digital hairstyle transfer system 106 generates a transferred hairstyle image that accurately depicts a person that is depicted within a source image. At the same time, in one or more embodiments, the digital hairstyle transfer system 106 also accurately depicts the person (depicted in within the source image) having a hairstyle that is depicted within a target image.

Figure 11:
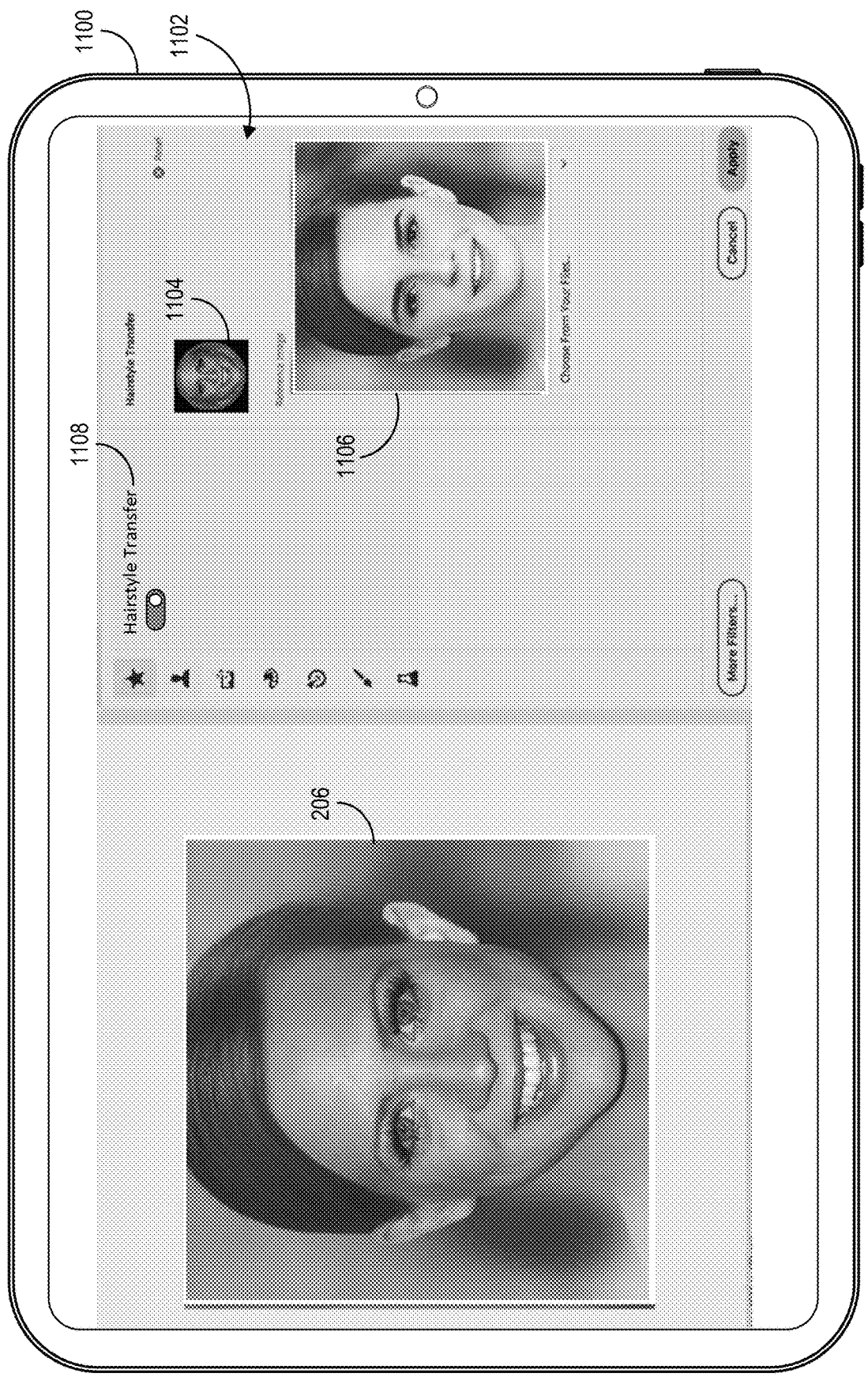
FIG. 11 illustrates a digital hairstyle transfer system displaying a transferred hairstyle image within a graphical user interface in accordance with one or more embodiments.

As mentioned above, in some instances, the digital hairstyle transfer system 106 displays a graphical user interface that includes a selectable option to transfer a hairstyle from a target image to a source image. For instance, FIG. 11 illustrates the digital hairstyle transfer system 106 providing, for display, a graphical user interface 1102 within a client device 1100. As shown in FIG. 11, the digital hairstyle transfer system 106 provides, for display within the graphical user interface 1102, a selectable option 1108 to initiate a hairstyle transfer between images. For instance, as illustrated in FIG. 11, the digital hairstyle transfer system 106 receives a source image selection 1104 and a target image selection 1106 (from a user of the client device 1100). Then, as shown in FIG. 11, upon detecting or receiving a user interaction with the selectable option 1108, the digital hairstyle transfer system 106 generates (and displays within the graphical user interface 1102) a transferred hairstyle image 206 based on the source image selection 1104 and the target image selection 1106 in accordance with one or more embodiments.

Indeed, as previously mentioned, in one or more embodiments, the digital hairstyle transfer system 106 receives a target image selection that is arbitrary. For instance, the digital hairstyle transfer system 106 receives a target image selection that is not within a set of template images for hairstyle transfers within the digital hairstyle transfer system 106. Furthermore, as shown in FIG. 11, the digital hairstyle transfer system 106 provides, within the graphical user interface 1102, a one-click selectable option 1108 that generates a transferred hairstyle image 206 (from a single user interaction). In some embodiments, the digital hairstyle transfer system 106 provides a one-click selectable option on a mobile device (e.g., a smartphone) and generates (for display) a transferred hairstyle image in accordance with one or more embodiments within the mobile device.

Figure 12:
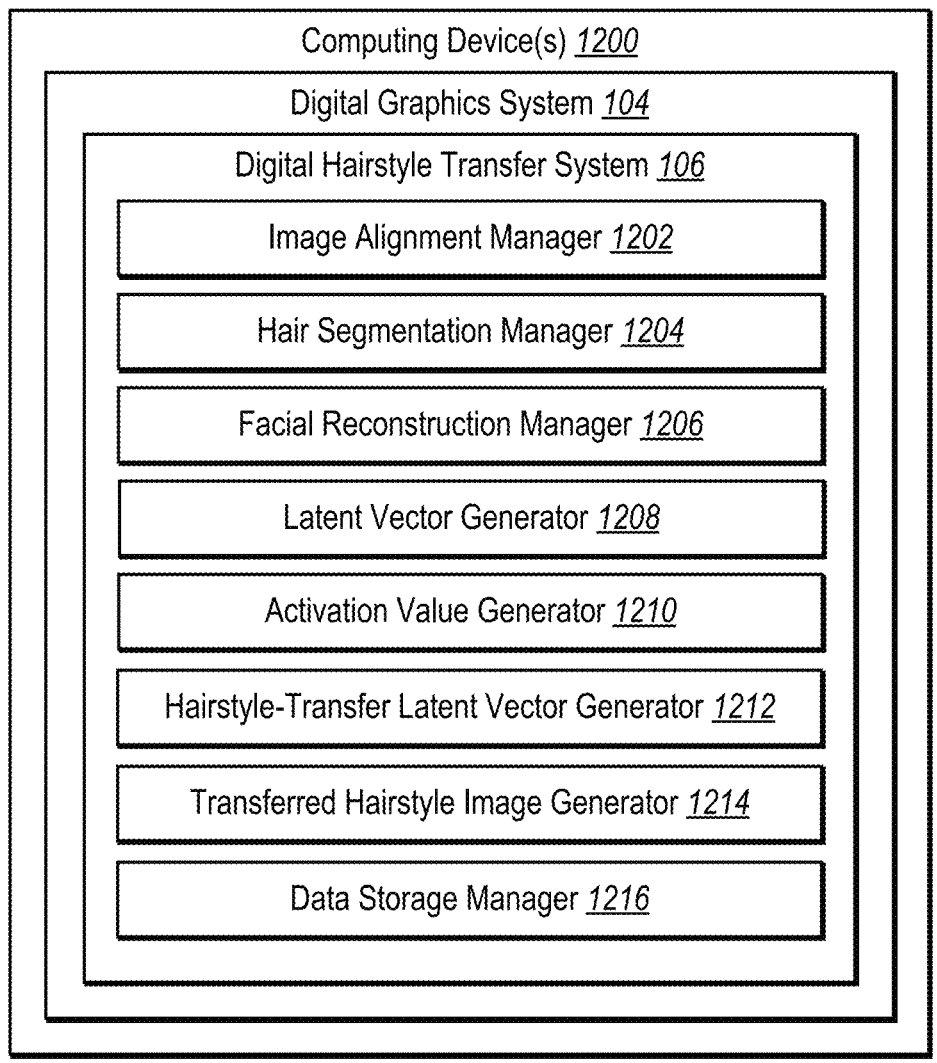
FIG. 12 illustrates a schematic diagram of a digital hairstyle transfer system in accordance with one or more embodiments.

Turning now to FIG. 12, additional detail will be provided regarding components and capabilities of one or more embodiments of the digital hairstyle transfer system. In particular, FIG. 12 illustrates an embodiment of an example digital hairstyle transfer system 106 executed by a computing device 1200 (e.g., the server device(s) 102). As shown by the embodiment of FIG. 12, the computing device 1200 includes or hosts the digital graphics system 104 and the digital hairstyle transfer system 106. Furthermore, as shown in FIG. 12, the digital hairstyle transfer system 106 includes an image alignment manager 1202, a hair segmentation manager 1204, a facial reconstruction manager 1206, a latent vector generator 1208, an activation value generator 1210, a hairstyle-transfer latent vector generator 1212, a transferred hairstyle image generator 1214, and a data storage manager 1216.

As just mentioned, and as illustrated in the embodiment of FIG. 12, the digital hairstyle transfer system 106 includes the image alignment manager 1202. For example, the image alignment manager 1202 identifies facial landmarks within a source image and a target image as described above (e.g., in relation to FIG. 3). Moreover, the image alignment manager 1202 modifies a scale and/or orientation of the source image and/or target image to align facial landmarks of the source image with facial landmarks of the target image as described above (e.g., in relation to FIG. 3).

Furthermore, as shown in FIG. 12, the digital hairstyle transfer system 106 includes the hair segmentation manager 1204. For instance, the hair segmentation manager 1204 segments hair (or hairstyle) features within an image to identify one or more regions of interest within the image (e.g., a source image and a target image) as described above (e.g., in relation to FIG. 4). In addition, the hair segmentation manager 1204 identifies hairstyle masks for the source and/or target image to identify an intersecting region between the hairstyle masks and/or differing regions between the hairstyle masks as described above (e.g., in relation to FIG. 4).

As illustrated in FIG. 12, the digital hairstyle transfer system 106 includes the facial reconstruction manager 1206. For example, the facial reconstruction manager 1206 utilizes a non-overlapping region (between hairstyle masks of a source image and target image) within the source image with a facial reconstruction model to generate a reconstructed source image as described above (e.g., in relation to FIG. 5). Moreover, the facial reconstruction manager 1206 generates a reconstructed source image that includes synthesized facial attributes in place of non-overlapping regions that will be exposed during a transfer of the hairstyle corresponding to the target image as described above (e.g., in relation to FIG. 5).

Additionally, as shown in FIG. 12, the digital hairstyle transfer system 106 includes the latent vector generator 1208. For example, the latent vector generator 1208 projects an image into a latent vector utilizing a face-generative neural network as described above (e.g., in relations to FIG. 6). Furthermore, the latent vector generator 1208 also adjusts the latent vector (for accuracy) by utilizing a loss between an image (e.g., source image and/or target image) that is synthesized using the latent vector and the input image as described above (e.g., in relation to FIG. 6).

Moreover, as shown in FIG. 12, the digital hairstyle transfer system 106 includes the activation value generator 1210. For instance, the activation value generator 1210 generates a modified source image by replacing pixels that depict hairstyle (or hair) within a source image with noise pixels and generating (or projecting) a modified latent vector from the modified source image as described above (e.g., in relation to FIG. 7). Additionally, the digital hairstyle transfer system 106 compares the modified latent vector (having the noise pixels in place of hair) and the source latent vector corresponding to the source image to identify activation values that control hairstyle (or hair) in the latent vector as described above (e.g., in relation to FIG. 7).

In addition, as illustrated in FIG. 12, the digital hairstyle transfer system 106 includes the hairstyle-transfer latent vector generator 1212. For instance, the hairstyle-transfer latent vector generator 1212 selectively combines a source latent vector and a target latent vector to generate a hairstyle-transfer latent vector as described above (e.g., in relation to FIG. 8). Furthermore, in some embodiments, the hairstyle-transfer latent vector generator 1212 selectively combines a source latent vector and a target latent vector by utilizing activation values from a source latent vector and activation values from a target latent vector that control hairstyle or hair as described above (e.g., in relation to FIG. 8).

As also illustrated in FIG. 12, the digital hairstyle transfer system 106 includes the transferred hairstyle image generator 1214. For example, the transferred hairstyle image generator 1214 utilizes a face-generative neural network to synthesize a hairstyle-transfer latent vector to generate a transferred hairstyle image that depicts a person depicted within a source image with a hairstyle from (or depicted from) a target image as described above (e.g., in relation to FIG. 9). In addition, in one or more embodiments, the transferred hairstyle image generator 1214 utilizes conditional projection to adjust a hairstyle-transfer latent vector as described above (e.g., in relation to FIG. 9). Moreover, in certain embodiments, the transferred hairstyle image generator 1214 utilizes blending effects between a generated transferred hairstyle image and a source image to refine the generated transferred hairstyle image as described above (e.g., in relation to FIG. 9).

Furthermore, as shown in FIG. 12, the digital hairstyle transfer system 106 includes the data storage manager 1216. In some embodiments, the data storage manager 1216 is implemented by one or more memory devices. Moreover, in some embodiments, the data storage manager 1216 maintains data to perform one or more functions of the digital hairstyle transfer system 106. For example, the data storage manager 1216 includes image data (e.g., a source image, a target image, a reconstructed source image, a transferred hairstyle image), latent vector data (e.g., a source latent vector, a target latent vector, a modified source latent vector, a modified target latent vector, activation values, hairstyle-transfer latent vector), machine learning data (e.g., face-generative neural network data, facial reconstruction model data, segmentation model data), image mask data (e.g., face masks, hairstyle masks), and/or graphical user interface data (e.g., selectable option elements, display elements, graphical user interface layouts).

Each of the components 1202-1216 of the computing device 1200 (e.g., the computing device 1200 implementing the digital hairstyle transfer system 106), as shown in FIG. 12, may be in communication with one another using any suitable technology. The components 1202-1216 of the computing device 1200 can comprise software, hardware, or both. For example, the components 1202-1216 can comprise one or more instructions stored on a computer-readable storage medium and executable by processor of one or more computing devices. When executed by the one or more processors, the computer-executable instructions of the digital hairstyle transfer system 106 (e.g., via the computing device 1200) can cause a client device and/or server device to perform the methods described herein. Alternatively, the components 1202-1216 and their corresponding elements can comprise hardware, such as a special purpose processing device to perform a certain function or group of functions. Additionally, the components 1202-1216 can comprise a combination of computer-executable instructions and hardware.

Furthermore, the components 1202-1216 of the digital hairstyle transfer system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1202-1216 may be implemented as a stand-alone application, such as a desktop or mobile application. Furthermore, the components 1202-1216 may be implemented as one or more web-based applications hosted on a remote server. The components 1202-1216 may also be implemented in a suite of mobile device applications or "apps." To illustrate, the components 1202-1216 may be implemented in an application, including but not limited to, ADOBE PHOTOSHOP, ADOBE PREMIERE, ADOBE LIGHTROOM, ADOBE ILLUSTRATOR, or ADOBE SUBSTANCE. "ADOBE," "ADOBE PHOTOSHOP," "ADOBE PREMIERE," "ADOBE LIGHTROOM," "ADOBE ILLUSTRATOR," or "ADOBE SUBSTANCE" are either registered trademarks or trademarks of Adobe Inc. in the United States and/or other countries.

Figure 13:
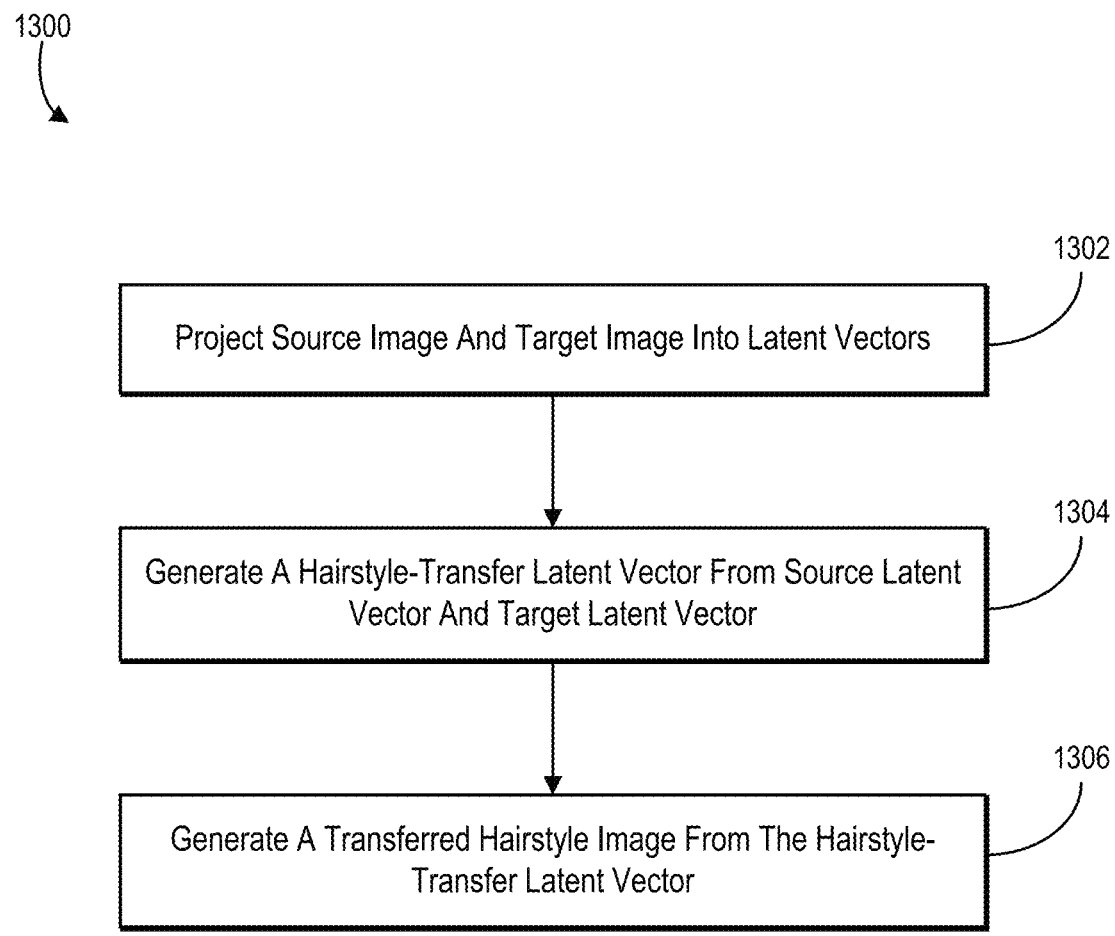
FIG. 13 illustrates a flowchart of a series of acts for generating a transferred hairstyle image in accordance with one or more embodiments.

FIGS. 1-12, the corresponding text, and the examples provide a number of different methods, systems, devices, and non-transitory computer-readable media of the digital hairstyle transfer system 106. In addition to the foregoing, one or more embodiments can also be described in terms of flowcharts comprising acts for accomplishing a particular result, as shown in FIG. 13. The acts shown in FIG. 13 may be performed in connection with more or fewer acts. Further, the acts may be performed in differing orders. Additionally, the acts described herein may be repeated or performed in parallel with one another or parallel with different instances of the same or similar acts. A non-transitory computer-readable medium can comprise instructions that, when executed by one or more processors, cause a computing device to perform the acts of FIG. 13. In some embodiments, a system can be configured to perform the acts of FIG. 13. Alternatively, the acts of FIG. 13 can be performed as part of a computer-implemented method.

As mentioned above, FIG. 13 illustrates a flowchart of a series of acts 1300 for generating a transferred hairstyle image in accordance with one or more embodiments. While FIG. 13 illustrates acts according to one embodiment, alternative embodiments may omit, add to, reorder, and/or modify any of the acts shown in FIG. 13.

As shown in FIG. 13, the series of acts 1300 include an act 1302 of projecting a source image and a target image into latent vectors. In particular, in one or more embodiments, the act 1302 includes projecting a source image into a source latent vector utilizing a face-generative neural network. Furthermore, in some embodiments, the act 1302 includes projecting a target image into a target latent vector utilizing a face-generative neural network. For example, a source image depicts a first person with a first hairstyle and a target image depicts a second person with a second hairstyle. In some embodiments, the act 1302 includes aligning a source image and a target image utilizing facial landmarks corresponding to the source image and facial landmarks corresponding to the target image.

In one or more embodiments, the act 1302 includes projecting a source image into a source latent vector by utilizing a face-generative neural network to iteratively adjust the source latent vector based on a loss between the source image and a synthesized source image generated from synthesizing the source latent vector. Furthermore, in one or more embodiments, the act 1302 includes projecting a target image into a target latent vector by utilizing a face-generative neural network to iteratively adjust the target latent vector based on a loss between the target image and a synthesized target image generated from synthesizing the target latent vector.

Furthermore, in one or more instances, the act 1302 includes identifying a non-overlapping region for a source image between a first hairstyle mask from the source image and a second hairstyle mask from a target image. Moreover, in one or more embodiments, the act 1302 includes utilizing a segmentation model to identify a first hairstyle mask from a source image and a second hairstyle mask from a target image. In some embodiments, the act 1302 includes modifying a non-overlapping region within a source image to generate a modified source image that includes a region from a target image in place of the non-overlapping region within the source image. In one or more embodiments, the act 1302 includes generating a reconstructed source image by replacing a non-overlapping region within a source image with facial attributes.

In addition, in one or more embodiments, the act 1302 include utilizing a facial reconstruction model to generate a reconstructed source image from a modified source image. For example, a reconstructed source image includes a synthesized facial attribute(s) in place of a non-overlapping region. Furthermore, in one or more embodiments, the act 1302 includes projecting a source image into a source latent vector by utilizing a face-generative neural network to project a reconstructed source image into a source latent vector.

In some embodiments, the act 1302 includes projecting a source image into a source latent vector by utilizing a facial reconstruction model to generate a reconstructed source image from the source image and projecting the reconstructed source image into the source latent vector. For instance, a reconstructed source image includes a synthesized facial attribute(s) in place of a non-overlapping region within a source image between a first hairstyle mask from the source image and a second hairstyle mask from a target image. In addition, as an example, a facial reconstruction model includes a face-generative neural network.

As shown in FIG. 13, the series of acts 1300 include an act 1304 of generating a hairstyle-transfer latent vector from a source latent vector and a target latent vector. In particular, in one or more embodiments, the act 1304 includes generating a hairstyle-transfer latent vector by selectively combining a source latent vector and a target latent vector. Furthermore, in one or more embodiments, the act 1304 includes generating a hairstyle-transfer latent vector by determining activation values from a source latent vector and a target latent vector that control a first hairstyle or a second hairstyle. In some embodiments, the act 1304 includes generating a hairstyle-transfer latent vector by selectively combining a source latent vector and a target latent vector based on activation values that control a first hairstyle and a second hairstyle. Moreover, in one or more embodiments, the act 1304 includes selectively combining a source latent vector and a target latent vector by replacing features corresponding to activation values that control a first hairstyle or a second hairstyle from a source latent vector with corresponding features from a target latent vector.

In some embodiments, the act 1304 includes determining activation values from a source latent vector that control a first hairstyle by projecting a modified source image into a modified source latent vector utilizing a face-generative neural network. For example, a modified source image includes noise pixels in place of a first hairstyle depicted within a source image. Moreover, in some embodiments, the act 1304 includes determining activation values from a source latent vector that control a first hairstyle by comparing a modified source latent vector to a source latent vector. Furthermore, in one or more embodiments, the act 1304 includes determining activation values from a target latent vector that control a second hairstyle by projecting a modified target image into a modified target latent vector utilizing a face-generative neural network. For instance, a modified target image includes noise pixels in place of a second hairstyle depicted within a target image. In some embodiments, the act 1304 includes determining activation values from a target latent vector that control a second hairstyle by comparing a modified target latent vector to a target latent vector.

In addition to (or in alternative to) the acts above, in some embodiments, the digital hairstyle transfer system 106 also performs a step for generating a hairstyle-transfer latent vector that encodes a first person from a source image with a second hairstyle from a target image. For instance, the acts and algorithms described above in relation to FIGS. 7 and 8 (e.g., the acts 202-712 and the acts 202-808) comprise the corresponding acts and algorithms for performing a step for generating a hairstyle-transfer latent vector that encodes a first person from a source image with a second hairstyle from a target image.

As shown in FIG. 13, the series of acts 1300 include an act 1306 of generating a transferred hairstyle image using a hairstyle-transfer latent vector. In particular, in some embodiments, the act 1306 includes generating a transferred hairstyle image that depicts a first person from a source image with a second hairstyle from a target image by synthesizing a hairstyle-transfer latent vector utilizing a face-generative neural network. In one or more embodiments, the act 1306 includes modifying a transferred hairstyle image utilizing a blending effect between a source image and a transferred hairstyle image. Furthermore, in some embodiments, the act 1306 includes providing, for display via a computing device, a graphical user interface including a selectable option to initiate a hairstyle transfer from a target image to a source image. In addition, in one or more embodiments, the act 1306 includes, based on identifying a user interaction with a selectable option, providing, for display via a computing device and within a graphical user interface, a generated transferred hairstyle image.

In one or more embodiments, the act 1306 includes synthesizing a hairstyle-transfer latent vector utilizing a face-generative neural network by iteratively adjusting the hairstyle-transfer latent vector utilizing at least one loss between an iteration of the transferred hairstyle image and a face mask from a source image or a second hairstyle mask from a target image. In some embodiments, the act 1306 includes determining a source loss based on a comparison between an iteration of a transferred hairstyle image and a face mask from a source image. For example, a face mask from a source image corresponds to regions depicting facial attributes within the source image. Furthermore, in some embodiments, the act 1306 includes determining a target loss based on a comparison between an iteration of a transferred hairstyle image and a second hairstyle mask from a target image. For instance, a second hairstyle mask from a target image corresponds to regions depicting the second hairstyle within the target image. In one or more embodiments, the act 1306 includes utilizing a discriminator to determine a discriminator loss from an iteration of a transferred hairstyle image. In some embodiments, the act 1306 includes iteratively adjusting a hairstyle-transfer latent vector utilizing a combination of a source loss, a target loss, and/or a discriminator loss.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 14:
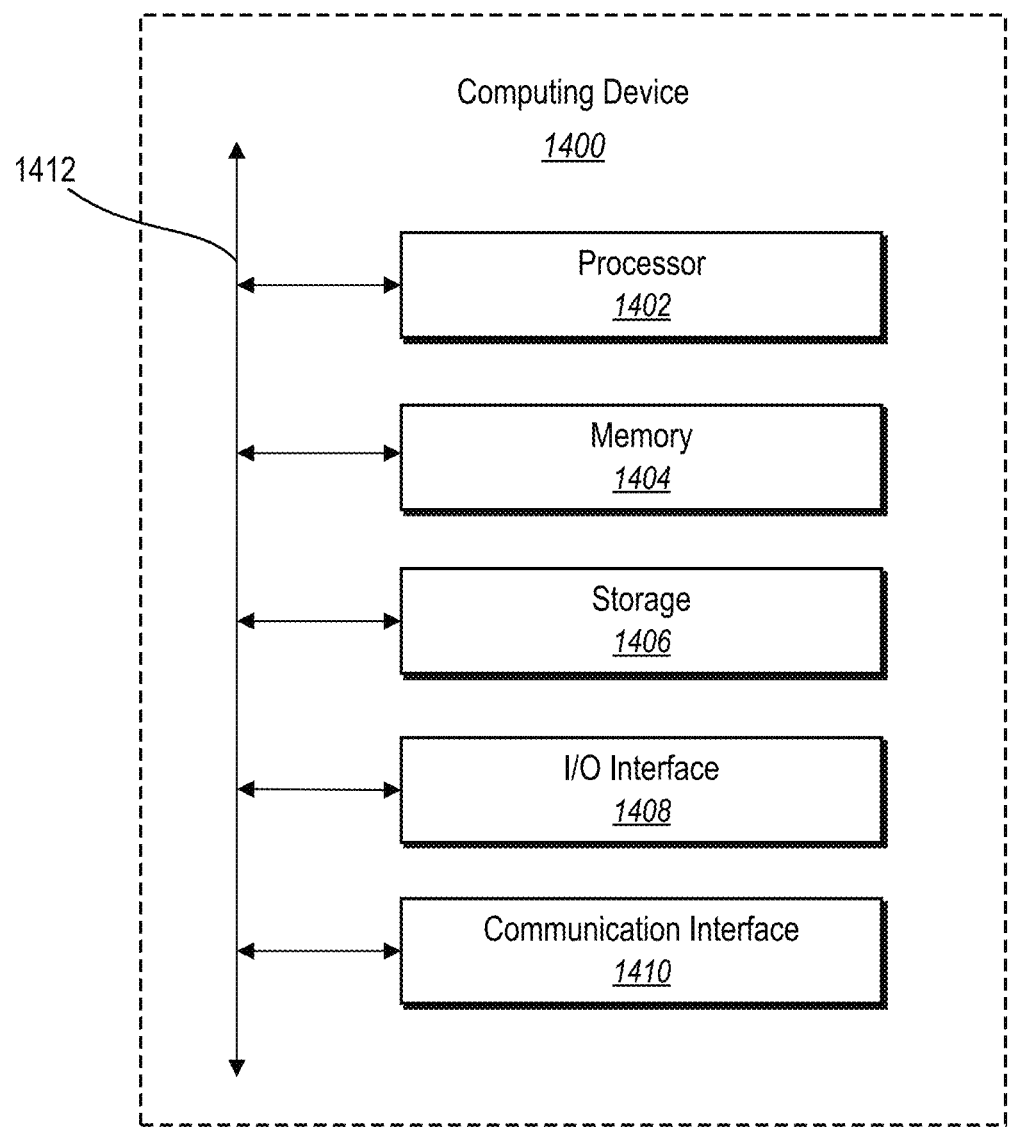
FIG. 14 illustrates a block diagram of an example computing device in accordance with one or more embodiments.

FIG. 14 illustrates a block diagram of an example computing device 1400 that may be configured to perform one or more of the processes described above. One will appreciate that one or more computing devices, such as the computing device 1400 may represent the computing devices described above (e.g., computing device 1200, server device(s) 102, and client device 110). In one or more embodiments, the computing device 1400 may be a mobile device (e.g., a mobile telephone, a smartphone, a PDA, a tablet, a laptop, a camera, a tracker, a watch, a wearable device, etc.). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, the storage device 1406 can include a non-transitory storage medium described above. The storage device 1406 may include a hard disk drive ("HDD"), flash memory, a Universal Serial Bus ("USB") drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller ("NIC") or network adapter for communicating with an Ethernet or other wire-based network or a wireless NIC ("WNIC") or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
    projecting a source image into a source latent vector utilizing a face-generative neural network, the source image depicting a first person with a first hairstyle;
    projecting a target image into a target latent vector utilizing the face-generative neural network, the target image depicting a second person with a second hairstyle;
    utilizing noise pixels to identify one or more source features that control the first hairstyle from the source latent vector and one or more target features that control the second hairstyle from the target latent vector;
    generating a hairstyle-transfer latent vector by selectively combining the source latent vector and the target latent vector by replacing one or more source features that control the first hairstyle from the source latent vector with one or more target features that control the second hairstyle from the target latent vector; and
    generating a transferred hairstyle image that depicts the first person from the source image with the second hairstyle from the target image by synthesizing the hairstyle-transfer latent vector utilizing the face-generative neural network.

2. The non-transitory computer-readable medium of claim 1, wherein the operations further comprise generating the hairstyle-transfer latent vector by:
    determining activation values from the source latent vector and the target latent vector that represent the one or more source features that control the first hairstyle or the one or more target features that control the second hairstyle; and
    selectively combining the source latent vector and the target latent vector based on the activation values that represent the one or more source features that control the first hairstyle or the one or more target features that control the second hairstyle.

3. The non-transitory computer-readable medium of claim 2, wherein the operations further comprise:
    determining the activation values from the source latent vector that represent the one or more source features that control the first hairstyle by:
        projecting a modified source image into a modified source latent vector utilizing the face-generative neural network, wherein the modified source image comprises noise pixels in place of the first hairstyle depicted within the source image; and
        comparing the modified source latent vector to the source latent vector; and
    determining the activation values from the target latent vector that represent the one or more target features that control the second hairstyle by:
        projecting a modified target image into a modified target latent vector utilizing the face-generative neural network, wherein the modified target image comprises noise pixels in place of the second hairstyle depicted within the target image; and
        comparing the modified target latent vector to the target latent vector.

4. The non-transitory computer-readable medium of claim 1, wherein the operations further comprise:
    identifying the one or more source features that control the first hairstyle utilizing an additional source latent vector projected from a modified source image having added a first set of noise pixels in place of the depicted first hairstyle; and
    identifying the one or more target features that control the second hairstyle utilizing an additional target latent vector projected from a modified target image having added a second set of noise pixels in place of the depicted second hairstyle.

5. The non-transitory computer-readable medium of claim 1, wherein the operations further comprise:
    identifying a non-overlapping region for the source image between a first hairstyle mask from the source image and a second hairstyle mask from the target image;
    modifying the non-overlapping region within the source image to generate a modified source image comprising a region from the target image in place of the non-overlapping region within the source image;
    utilizing a facial reconstruction model to generate a reconstructed source image from the modified source image, wherein the reconstructed source image comprises synthesized facial attributes in place of the non-overlapping region; and
    projecting the source image into the source latent vector by utilizing the face-generative neural network to project the reconstructed source image into the source latent vector.

6. The non-transitory computer-readable medium of claim 1, wherein the operations further comprise projecting the source image into the source latent vector by utilizing the face-generative neural network to iteratively adjust the source latent vector based on a loss between the source image and a synthesized source image generated from synthesizing the source latent vector.

7. The non-transitory computer-readable medium of claim 1, wherein the operations further comprise synthesizing the hairstyle-transfer latent vector utilizing the face-generative neural network by iteratively adjusting the hairstyle-transfer latent vector utilizing at least one loss between an iteration of the transferred hairstyle image and a face mask from the source image or a second hairstyle mask from the target image.

8. The non-transitory computer-readable medium of claim 1, wherein the operations further comprise modifying the transferred hairstyle image utilizing a blending effect between the source image and the transferred hairstyle image.

9. The non-transitory computer-readable medium of claim 1, wherein the operations further comprise:
   providing, for display via a computing device, a graphical user interface comprising a selectable option to initiate a hairstyle transfer from the target image to the source image; and
   based on identifying a user interaction with the selectable option, providing, for display via the computing device and within the graphical user interface, the generated transferred hairstyle image.

10. The non-transitory computer-readable medium of claim 1, wherein the operations further comprise aligning the source image and the target image utilizing facial landmarks corresponding to the source image and facial landmarks corresponding to the target image.

11. A system comprising:
   a memory component comprising:
      a source image depicting a first person with a first hairstyle; and
      a target image depicting a second person with a second hairstyle; and
   a processing device coupled to the memory component, the processing device to perform operations comprising:
      projecting the source image into a source latent vector utilizing a face-generative neural network;
      projecting the target image into a target latent vector utilizing the face-generative neural network;
      generating a hairstyle-transfer latent vector by:
         utilizing noise pixels to determine a first set of activation values from the source latent vector that represent one or more source features that control the first hairstyle and a second set of activation values from the target latent vector that represent one or more target features that control the second hairstyle; and
         selectively combining the source latent vector and the target latent vector by replacing one or more source features that control the first hairstyle from the source latent vector based on the first set of activation values with one or more target features that control the second hairstyle from the target latent vector based on the second set of activation values; and
      generating a transferred hairstyle image that depicts the first person from the source image with the second hairstyle from the target image by synthesizing the hairstyle-transfer latent vector utilizing the face-generative neural network.

12. The system of claim 11, wherein the operations further comprise determining the first set of activation values from the source latent vector that control the first hairstyle by:
   projecting a modified source image into a modified source latent vector utilizing the face-generative neural network, wherein the modified source image comprises the noise pixels in place of the first hairstyle depicted within the source image; and
   comparing the modified source latent vector to the source latent vector.

13. The system of claim 11, wherein the face-generative neural network comprises a generative adversarial neural network.

14. The system of claim 11, wherein the operations further comprise projecting the source image into the source latent vector by utilizing a facial reconstruction model that comprises the face-generative neural network to:
   generate a reconstructed source image from the source image, wherein the reconstructed source image comprises synthesized facial attributes in place of a non-overlapping region within the source image between a first hairstyle mask from the source image and a second hairstyle mask from the target image; and
   project the reconstructed source image into the source latent vector.

15. The system of claim 11, wherein the operations further comprise synthesizing the hairstyle-transfer latent vector utilizing the face-generative neural network by iteratively adjusting the hairstyle-transfer latent vector utilizing at least one loss between an iteration of the transferred hairstyle image and a face mask from the source image or a second hairstyle mask from the target image.

16. The system of claim 15, wherein the operations further comprise:
   determining a source loss based on a comparison between the iteration of the transferred hairstyle image and the face mask from the source image;
   determining a target loss based on a comparison between the iteration of the transferred hairstyle image and the second hairstyle mask from the target image; and
   iteratively adjusting the hairstyle-transfer latent vector utilizing a combination of the source loss and the target loss.

17. A computer-implemented method comprising:
   projecting a source image into a source latent vector utilizing a face-generative neural network, the source image depicting a first person with a first hairstyle;
   projecting a target image into a target latent vector utilizing the face-generative neural network, the source image depicting a second person with a second hairstyle;
   utilizing noise pixels to identify one or more source features that control the first hairstyle from the source latent vector and one or more target features that control the second hairstyle from the target latent vector;
   performing a step for generating a hairstyle-transfer latent vector that encodes the first person from the source image with the second hairstyle from the target image utilizing the one or more source features from the source latent vector and the one or more target features from the target latent vector; and
   generating a transferred hairstyle image that depicts the first person from the source image with the second hairstyle from the target image by synthesizing the hairstyle-transfer latent vector utilizing the face-generative neural network.

18. The computer-implemented method of claim 17, further comprising:
- utilizing a segmentation model to identify a first hairstyle mask from the source image and a second hairstyle mask from the target image;
- identifying a non-overlapping region for the source image between the first hairstyle mask and the second hairstyle mask;
- generate a reconstructed source image by replacing the non-overlapping region within the source image with facial attributes; and
- projecting the source image into the source latent vector by utilizing the face-generative neural network to project the reconstructed source image into the source latent vector.

19. The computer-implemented method of claim 17, further comprising projecting the source image into the source latent vector by utilizing the face-generative neural network to iteratively adjust the source latent vector based on a loss between the source image and a synthesized source image generated from synthesizing the source latent vector.

20. The computer-implemented method of claim 17, further comprising synthesizing the hairstyle-transfer latent vector utilizing the face-generative neural network by:
- determining a source loss based on a comparison between an iteration of the transferred hairstyle image and a face mask from the source image, wherein the face mask from the source image corresponds to regions depicting facial attributes within the source image;
- determining a target loss based on a comparison between the iteration of the transferred hairstyle image and a second hairstyle mask from the target image, wherein the second hairstyle mask from the target image corresponds to regions depicting the second hairstyle within the target image;
- utilizing a discriminator to determine a discriminator loss from the iteration of the transferred hairstyle image; and
- iteratively adjusting the hairstyle-transfer latent vector utilizing a combination of the source loss, the target loss, and the discriminator loss.

* * * * *